(12) United States Patent
Nakamoto et al.

(10) Patent No.: US 7,949,124 B2
(45) Date of Patent: May 24, 2011

(54) INFORMATION PROCESSING APPARATUS, CONTROL METHOD FOR THE SAME, PROGRAM AND STORAGE MEDIUM

(75) Inventors: Yasuhiro Nakamoto, Kawasaki (JP); Junichi Hayashi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1170 days.

(21) Appl. No.: 11/621,785

(22) Filed: Jan. 10, 2007

(65) Prior Publication Data

US 2007/0192250 A1 Aug. 16, 2007

(30) Foreign Application Priority Data

Jan. 11, 2006 (JP) ................................. 2006-004194
Dec. 26, 2006 (JP) ................................. 2006-350498

(51) Int. Cl.
*H04M 1/03* (2006.01)
*G06F 17/60* (2006.01)

(52) U.S. Cl. ......... 379/387.01; 705/50; 705/51; 705/54; 709/229; 711/103; 713/176; 713/185; 713/193; 713/194; 726/2; 726/27; 726/31; 726/32

(58) Field of Classification Search ............... 369/53.21; 379/114.01, 387.01; 382/100; 700/94; 705/27, 705/37, 50, 51, 54; 711/162, 103; 713/193, 713/201, 176, 185, 194; 726/31, 2, 27, 32; 709/229

See application file for complete search history.

(56) References Cited

U.S. PATENT DOCUMENTS

| | | | |
|---|---|---|---|
| 5,499,294 A | | 3/1996 | Friedman |
| 6,081,897 A | * | 6/2000 | Bersson ........................... 726/32 |
| 6,138,203 A | * | 10/2000 | Inokuchi et al. ............... 711/103 |
| 6,314,409 B2 | * | 11/2001 | Schneck et al. ................. 705/54 |
| 6,360,325 B1 | * | 3/2002 | Chao ................................ 726/31 |
| 6,519,701 B1 | * | 2/2003 | Kawamura et al. ............... 726/2 |
| 6,591,365 B1 | * | 7/2003 | Cookson ........................ 713/176 |
| 6,615,353 B1 | * | 9/2003 | Hashiguchi .................... 713/185 |
| 6,693,965 B1 | * | 2/2004 | Inoue et al. ............... 375/240.19 |

(Continued)

FOREIGN PATENT DOCUMENTS

CN 1452166 A 10/2003

(Continued)

OTHER PUBLICATIONS

The above references were cited in a May 22, 2009 Chinese Office Action that issued in Chines Patent Application No. 200710000215. 3, which is enclosed with English Translation.

*Primary Examiner* — Gerald Gauthier
(74) *Attorney, Agent, or Firm* — Cowan, Liebowitz & Latman, P.C.

(57) ABSTRACT

An information processing apparatus that generates private information used as one of an encryption key for encrypting data or a generation key for generating falsification detection information used in detecting falsification of data, comprises a storage unit adapted to prestore key information, an input unit adapted to input calculation target information, a calculating unit adapted to perform a calculation on targeted information based on the key information held in the storage unit, a detecting unit adapted to detect a predetermined event, and a control unit adapted, when triggered by detection of the event by the detecting unit, to perform controls to generate the private information by making the calculating unit perform the calculation with the input calculation target information as the targeted information, and to place the key information stored in the storage unit in an unusable state.

3 Claims, 21 Drawing Sheets

U.S. PATENT DOCUMENTS

| | | | |
|---|---|---|---|
| 6,751,598 B1 * | 6/2004 | Yagawa et al. | 705/51 |
| 6,847,707 B1 * | 1/2005 | Suda et al. | 379/114.01 |
| 7,143,445 B1 * | 11/2006 | Ishiguro et al. | 726/31 |
| 7,502,657 B2 * | 3/2009 | Nakata et al. | 700/94 |
| 7,503,073 B2 * | 3/2009 | Kawamoto et al. | 726/27 |
| 7,505,955 B2 * | 3/2009 | Watanabe et al. | 1/1 |
| 7,533,276 B2 * | 5/2009 | Matsushima et al. | 713/194 |
| 7,584,288 B2 * | 9/2009 | Ebihara et al. | 709/229 |
| 7,747,872 B2 * | 6/2010 | Lipsky et al. | 713/193 |
| 2003/0033537 A1 * | 2/2003 | Fujimoto et al. | 713/193 |
| 2003/0218950 A1 | 11/2003 | Yamada | |
| 2005/0120245 A1 * | 6/2005 | Torisaki et al. | 713/201 |
| 2006/0149683 A1 | 7/2006 | Ikeda | |
| 2006/0224470 A1 * | 10/2006 | Garcia Ruano et al. | 705/27 |
| 2006/0291357 A1 * | 12/2006 | Ichinose et al. | 369/53.21 |
| 2007/0014428 A1 * | 1/2007 | Kountchev et al. | 382/100 |
| 2008/0022061 A1 * | 1/2008 | Ito et al. | 711/162 |
| 2008/0046352 A1 * | 2/2008 | Jung et al. | 705/37 |

FOREIGN PATENT DOCUMENTS

| | | |
|---|---|---|
| CN | 1619589 A | 5/2005 |
| WO | 2004-109972 A | 12/2004 |
| WO | 2004-1099972 A | 12/2004 |

* cited by examiner

FIG. 12
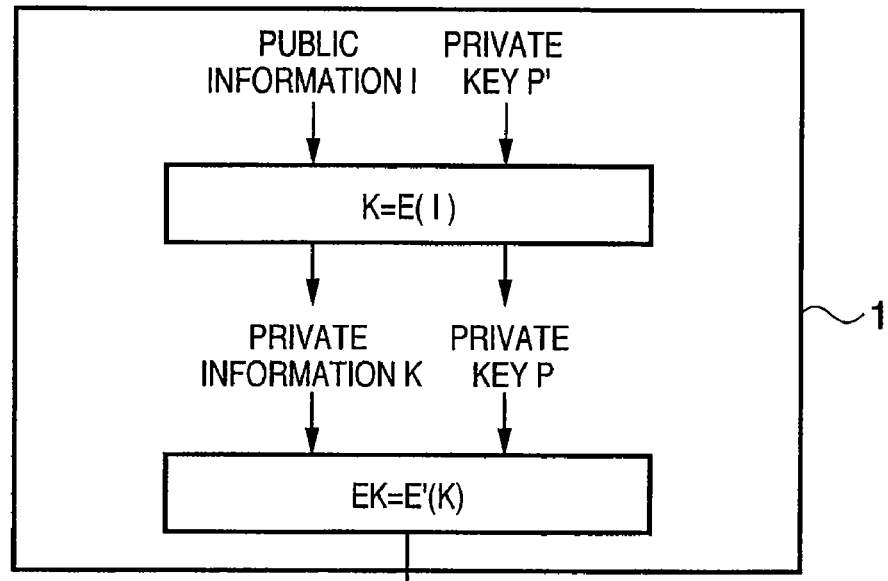
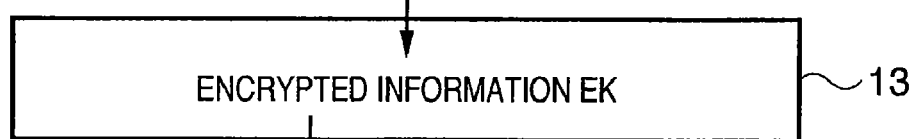
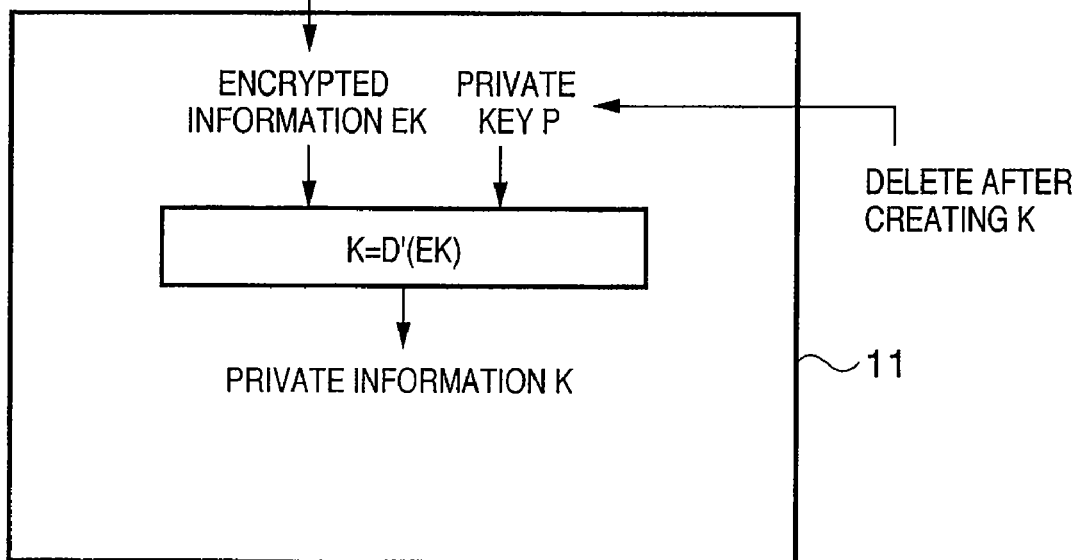

INFORMATION PROCESSING APPARATUS, CONTROL METHOD FOR THE SAME, PROGRAM AND STORAGE MEDIUM

BACKGROUND OF THE INVENTION

1. Field of the Invention

The present invention relates to a technique for setting private information in an apparatus.

2. Description of the Related Art

The use of digital cameras has rapidly become widespread in recent years. Images taken with a digital camera can be stored as electronic image data. This not only eliminates the hassle of developing and printing associated with conventional silver halide photography, but also allows for easy storage and retrieval of images without degradation over time, and for data to be sent to remote locations using communication lines. For this reason, digital cameras are used in many business fields.

Take the accident insurance industry, for example, in which images of damaged vehicles are taken and assessments are made based on these images, or the building industry in which images are taken of buildings to check the progress and specifications of work at construction sites. At the Ministry of Land, Infrastructure and Transport, the use of images taken with a digital camera in the recording of civil work sites is already allowed.

However, the disadvantages of digitization have also been pointed out. The use of commercially available application programs such as photo retouching tools enables images to be easily processed and altered on a personal computer. In other words, the ease with which processing and alteration can be performed means that with accident photographs and reports in which images are used as evidence, the reliability of images taken with a digital camera is reduced in comparison to silver halide photographic images.

Although modifying images is not impossible even with silver halide photography, modification is not really viable given that either the costs of performing modification greatly outweigh the benefits obtained by modification, or the results of modifying images are unnatural, thereby providing grounds for adopting silver halide images as evidence. Consequently, the accident insurance and building industries are concerned that this will become a major issue in the future, and a way of overcoming this shortcoming is being sought.

At present, a system that employs encryption technology has been proposed for detecting falsification of image data using digital signature data (U.S. Pat. No. 5,499,294A).

This system is configured with an image generating apparatus (camera) for generating image data, and an image verification apparatus for verifying the integrity of the image data (i.e., that the data has not been modified). The camera executes a prescribed calculation based on private information unique to the camera and digitized image data that has been shot, and generates digital signature data, which is the information identifying the image data (for detecting falsification). The camera then outputs digital signature data and image data. The image verification apparatus verifies the image data by comparing data obtained by performing a prescribed calculation on the image data and data obtained by performing the inverse of the calculation to generate the digital signature data. In the above patent, hash functions (compression functions) and public key encryption are used in generating digital signature data.

A MAC (Message Authentication Code) is also sometimes used instead of digital signature data. MACs are generated using common key encryption, hash functions or the like, and have a faster processing speed than public key encryption. However, since the same common key is used for generating and verifying a MAC, the common key needs to be stringently managed in both the camera and the image verification apparatus.

Image data taken with a camera is usually stored on a small memory card (nonvolatile memory) connected to the camera, these memory cards being configured mainly by flash EEPROM. Measures have been taken to increase memory density using the latest miniaturization technology, with approximately 4 square-centimeter, 2-3 mm high memory cards being produced that have several hundred megabyte storage capacity. Further, memory cards and IC cards now becoming commercially viable have a calculating unit configured with a CPU, a RAM, and a ROM in addition to the flash EEPROM, and implement a security function. By using these calculation functions, data for detecting falsification of image data and the like can be generated in memory cards and IC cards external to the camera.

Consideration is given here to a configuration related to a camera or similar image generating apparatus that detects falsification of data such as image data using digital signature data, a MAC or other verification data, as disclosed in U.S. Pat. No. 5,499,294A. As mentioned above, key data is used in this configuration when generating verification data, although security in terms of preventing falsification cannot be maintained if this key data is leaked. Private information such as key data that calls for private management thus needs to be set in an apparatus such as an image generating apparatus, while ensuring security.

The following are conceivable methods of setting private information while ensuring security.

(1) Encrypt private information, and decrypt the encrypted private information in the apparatus. Note that encrypted private information is decrypted using a decryption key.

(2) Input public information to the apparatus, and generate private information in the apparatus using preset key information.

However, with these methods, private information is compromised if key information in the apparatus is leaked as a result of unauthorized analysis or the like.

SUMMARY OF THE INVENTION

The present invention, which was made in view of the above problems, has as its object to provide a technique for setting private information in an apparatus while ensuring a level of security above that of conventional methods.

To achieve the above object, an information processing apparatus according to the present invention is provided with the following configuration.

The information processing apparatus of the present invention is an information processing apparatus that generates private information used as one of an encryption key for encrypting data or a generation key for generating falsification detection information used in detecting falsification of data, and includes a storage unit adapted to prestore key information; an input unit adapted to input calculation target information; a calculating unit adapted to perform a calculation on targeted information based on the key information stored in the storage unit; a detecting unit adapted to detect a predetermined event; and a control unit adapted, when triggered by detection of the event by the detecting unit, to perform controls to generate the private information by making the calculating unit perform the calculation with the input calculation target information as the targeted information, and to place the key information stored in the storage unit in an unusable state.

A control method of an information processing apparatus according to the present invention is provided with the following configuration. That is, the method is a control method for an information processing apparatus that includes a storage unit adapted to prestore key information and generates private information used as one of an encryption key for encrypting data or a generation key for generating falsification detection information used in detecting falsification of data, comprising an input step of inputting calculation target information; a detecting step of detecting a predetermined event; and a control step adapted, when triggered by detection of the event in the detecting step, to perform controls to generate the private information by performing a calculation on the input calculation target information based on the key information stored in the storage unit, and to place the key information stored in the storage unit in an unusable state.

Further features of the present invention will become apparent from the following description of exemplary embodiments (with reference to the attached drawings).

BRIEF DESCRIPTION OF THE DRAWINGS

FIG. 12 is a block diagram schematically showing an outline of the processing of the configuration according to the first and second embodiments.

DESCRIPTION OF THE EMBODIMENTS

Embodiments of the present invention are described below in detail with reference to the accompanying drawings. Incidentally, the constitutional elements disclosed in the embodiments are merely by way of example, the scope of the present invention not being limited to only these constitutional elements.

First Embodiment (Apparatus Configuration)

Figure 1:
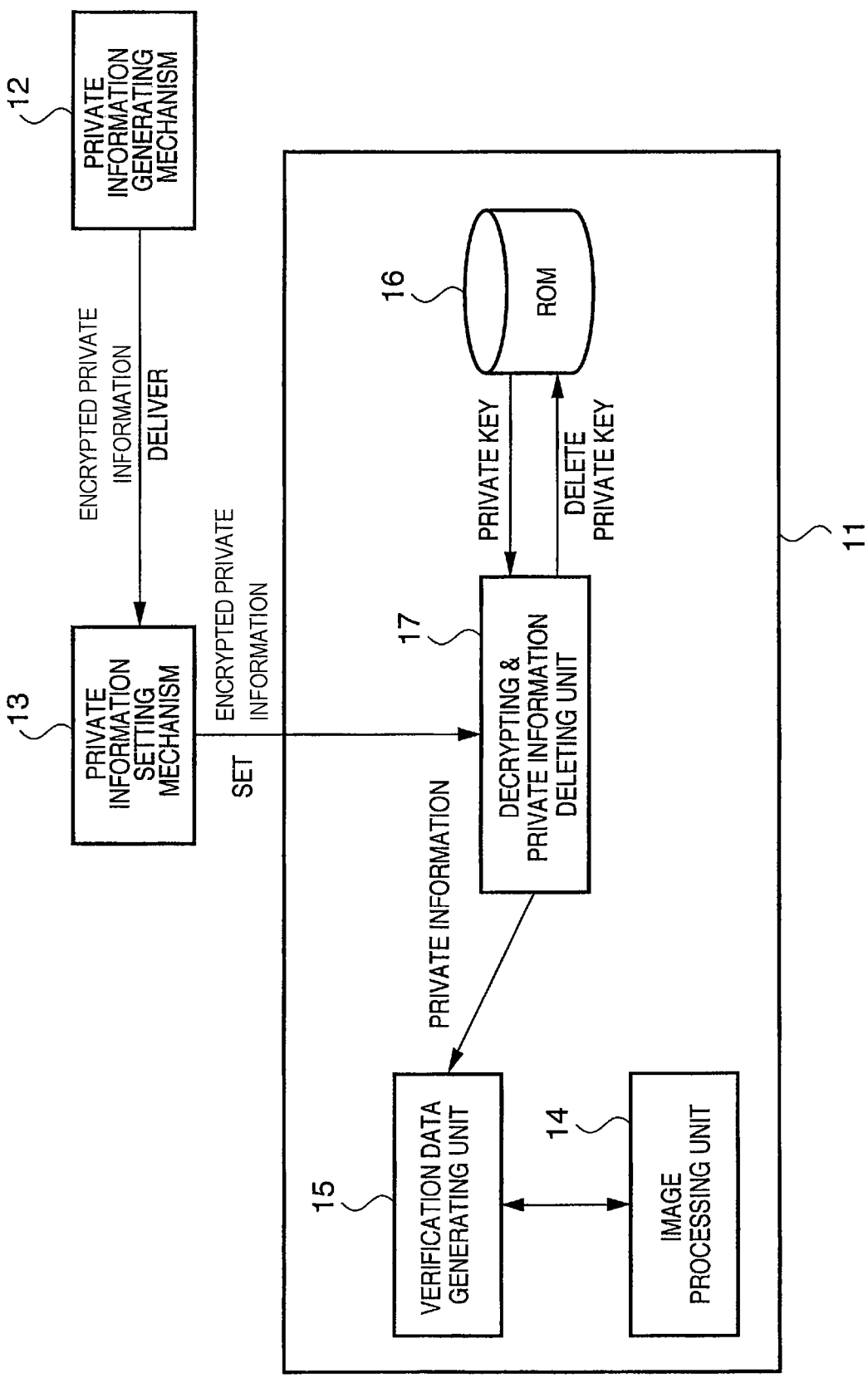
FIG. 1 is a block diagram showing an exemplary system configuration that includes an information processing apparatus according to first and second embodiments.

FIG. 1 is a block diagram showing an exemplary system configuration that includes an information processing apparatus according to the present embodiment. As shown in FIG. 1, in the present embodiment there exists an image generating apparatus 11 as an information processing apparatus according to the present embodiment, a private information generating mechanism 12, and a private information setting mechanism 13.

(Image Generating Apparatus 11)

The image generating apparatus 11 basically has the functional configuration of an image processing unit 14, a verification data generating unit 15, a ROM 16, and a decrypting & private information deleting unit 17.

The image processing unit 14 has a function of generating/shooting image data, a function of generating auxiliary parameters, and a function of generating image files with verification data. Incidentally, in the case where the image generating apparatus 11 is a camera, auxiliary parameters include a shooting time, a focal distance, an aperture value, an ISO sensitivity, a photometry mode, an image file size, and shooter information. The image files with verification data are configured, for example, with image data, verification data (falsification detection information), and auxiliary parameters.

The verification data generating unit 15 has a function of setting both private information for use in creating verification data and public information unique to the image generating apparatus 11, and a function of generating verification data for verifying generated image data.

The ROM 16 has a function of securely holding/managing a private key. A private key can be securely managed, for example, by using tamper-resistant technology. Note that the ROM 16 has a function of deleting stored information as a result of the input of an overwrite instruction, for example, as described later. Thus, in the present embodiment, the ROM 16 is not a read-only memory in the strict sense of the term. Note that the ROM 16 can also be configured by a memory apparatus that performs processing to bar access to a private key as a result of the input of a prescribed instruction. In this case, the "deletion" of a private key (described later) equates to the input to the ROM 16 of an instruction to perform processing for barring access to a private key.

The decrypting & private information deleting unit 17 has a function of using the private key to decrypt encrypted private information for use in generating verification data, a function of determining a first execution time of the decryption function, and a function of deleting the private key from the ROM 16 after the first execution time. Incidentally, the encrypted private information is set by the private information setting mechanism 13, as described later.

Note that the image generating apparatus 11, as an information processing apparatus according to the present embodiment, is realized by an image capturing apparatus such as a digital camera, a digital video camera or a scanner, an electronic device with a camera unit, a computer with a camera connected thereto, a mobile telephone, or a PDA. Hereinafter, the image generating apparatus 11 is described as a camera for the sake of simplicity.

(Private Information Generating Mechanism 12)

The private information generating mechanism 12 has a function of managing the private information unique to the camera 11, a function of encrypting private information using the private key, and a function of delivering encrypted private information to the private information setting mechanism 13. Incidentally, the private key and private information are securely managed in the private information generating mechanism 12, although security on a channel during delivery cannot be guaranteed; that is, the possibility exists of data being externally referenced during delivery.

Note that the private information generating mechanism 12 can be realized, for example, by an information processing apparatus such as a PC (personal computer), a WS (workstation), or a PDA (personal digital assistant). Also, for example, data can be accumulated in the information processing apparatus, and software installed to make the information processing apparatus function as a Web server capable of distributing the data.

Information is delivered from the private information generating mechanism 12 to the private information setting mechanism 13 by, for example, a physical delivery system such as a truck or postal mail or by electronic communication via a network typified by the Internet.

Hereinafter, for the sake of simplicity, the private information generating mechanism 12 is assumed to be realized by a PC, which is described as the generating apparatus 12.

(Private Information Setting Mechanism 13)

The private information setting mechanism 13 has a function of receiving encrypted private information delivered from the generating apparatus 12, and a function of setting the encrypted private information in the camera 11. Note that the private information setting mechanism 13 may function to set encrypted private information received as an item of mail in the camera 11. Alternatively, the private information setting mechanism 13 may be realized as a PC, and have a function of setting the encrypted private information received via a USB memory or a network in the camera 11. Hereinafter, for the sake of simplicity, the private information setting mechanism 13 is assumed to be realized as a PC, which is referred to as the setting apparatus 13.

Note that although the camera 11, the generating apparatus 12 and the setting apparatus 13 are described in the present embodiment as each being realized by a single apparatus for the sake of convenience, they may also be realized by a configuration in which resources are dispersed among a plurality of apparatuses. For example, storage and calculation resources may be dispersed among a plurality of apparatuses. Alternatively, parallel processing may be performed after dispersing resources to each constitutional element virtually realized on the apparatus.

(Prerequisite)

The data of each apparatus is described next as a prerequisite for processing.

Figure 5:
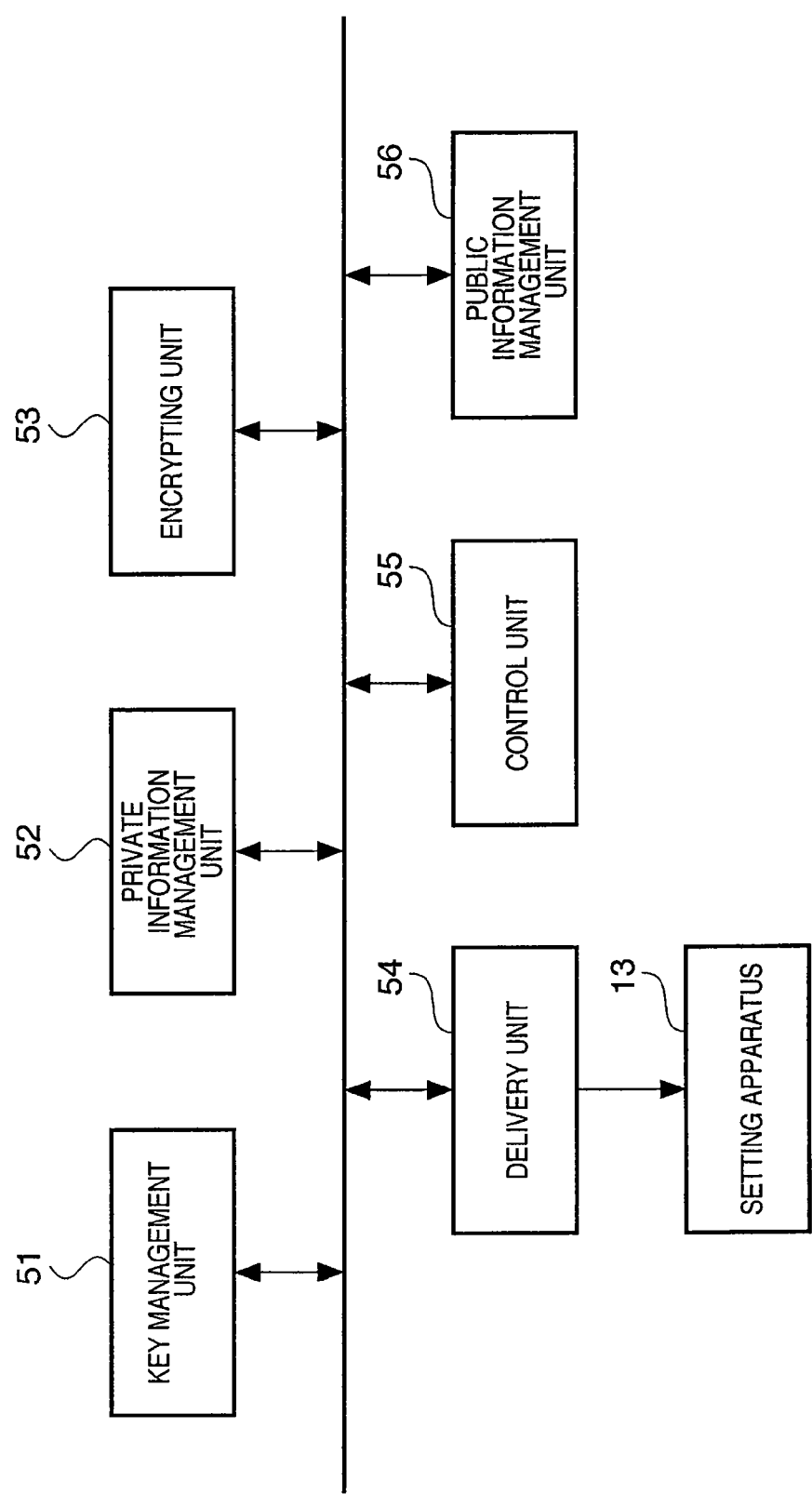
FIG. 5 is a block diagram schematically showing a detailed configuration of a private information generating mechanism.

The generating apparatus 12 stores and retains a predetermined private key P, private information K and public information I in a key management unit 51, a private information management unit 52, and a public information management unit 56, as shown in FIG. 5. The private key P and the private information K express numerical values, and are set as numerical values having a prescribed bit length. The public information I is bound to (i.e., associated with) information unique to the camera 11. Information unique to the camera includes, for example, a camera ID, a manufacturing number or a serial number as identification information identifying the camera. On the other hand, the private key P is information common to all cameras 11.

Note that the private information K can utilize data output by a calculation of a prescribed function, with the public information I and a private key P' that differs from the above P as inputs. Here, the private key P' is also assumed to be data common to all cameras 11, similarly to the private key P.

Here, the prescribed function, when expressed as an equation, indicates $K=E(\ )$ such as $E(I,P')$. A calculation related to common key encryption, public key encryption, a MAC, a hash function or the like can be applied in $E(\ )$. If $E(\ )$ is a calculation related to common key encryption, $E(x,y)$ should encrypt a plaintext y with a key x. Alternatively, if $E(\ )$ is a calculation related to a hash function, $E(x,y)$ should compute a hash value for a message that concatenates a message x and a message y. In all cases, the generated private information K is generated from the private key P' common to all the cameras 11, using the public information I, which differs for each of the cameras. As a result, the private information K can be said to be information unique to the camera 11.

Note that in the present embodiment, the public information I is described as being retained in advance in the public information management unit 56, although the present invention is not limited to this, and may be configured so that when generating the private information K, a different value is dynamically produced for each camera 11, and the produced value is used as the public information I. In this case, it is possible to utilize a random number generated using a random number generator or the like (not shown) as the public information I. Also, the produced public information I may be recorded in the public information management unit 56.

Here, the configuration of the generating apparatus 12 is described with reference to FIG. 5. FIG. 5 is a block diagram schematically showing a detailed configuration of the private information generating mechanism (generating apparatus) 12.

In FIG. 5, the key management unit 51 is a function element that manages the private key P, and can be realized, for example, by a memory apparatus implementing tamper-resistant technology. The private information management unit 52 is a function element that manages the private information K, and can be realized, for example, by a memory apparatus implementing tamper-resistant technology. An encrypting unit 53 is a function element that executes encryption such as common key encryption or public key encryption. The public information management unit 56 is a function element that manages the public information I of the camera 11.

Note that a delivery unit 54 and a control unit 55 are described together with the description of processing that uses these function elements.

(Private Information Encryption)

Figure 6:
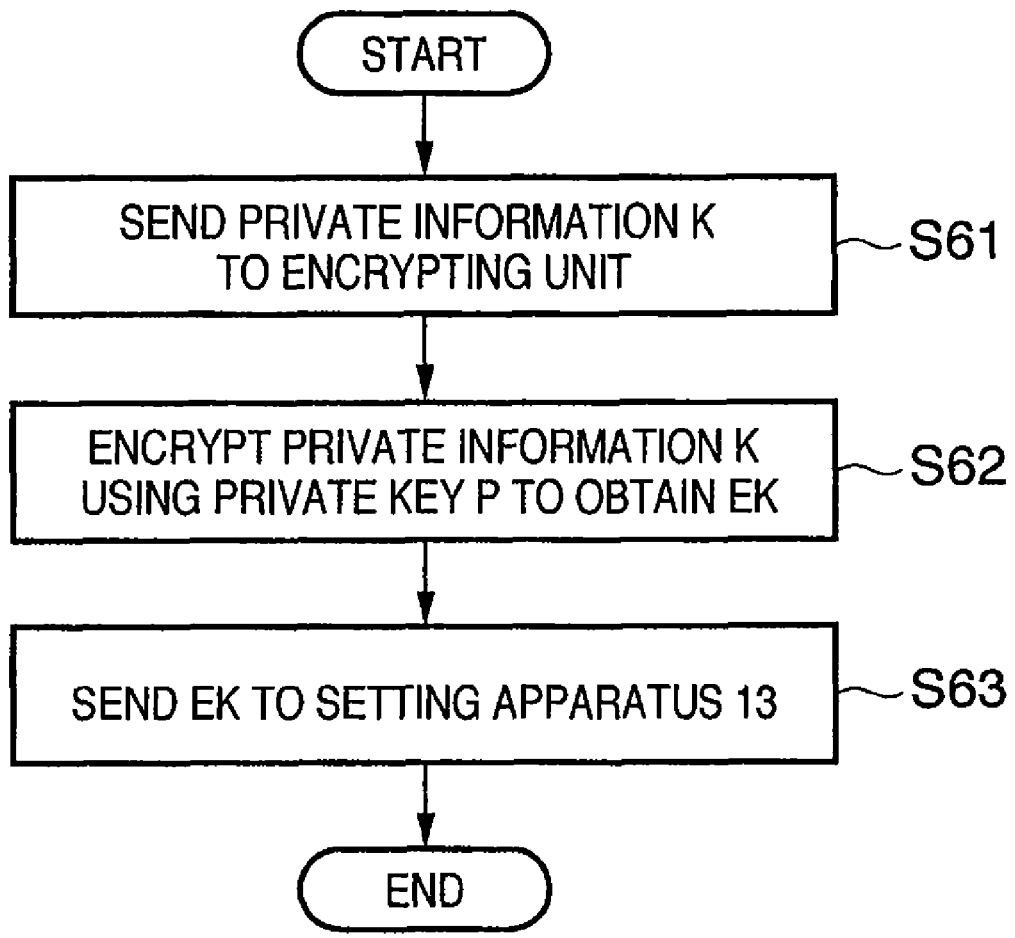
FIG. 6 is a flowchart showing the flow of private information encryption.

The flow of processing performed by the generating apparatus 12 to encrypt private information and deliver the encrypted private information to the setting apparatus 13 (private information encryption) is described next with reference to FIG. 6. FIG. 6 is a flowchart showing the flow of private information encryption.

Firstly, the private information K held in the private information management unit 52, which differs for each camera 11, is loaded in the encrypting unit 53 (step S61).

Next, the input private information K is encrypted using the private key P held in the key management unit 51 (step S62). Let the encrypted private information be EK.

Next, the delivery unit 54 is used to send the above EK to the setting apparatus 13 (step S63).

Incidentally, the key management unit 51 and the private information management unit 52 are memories that hold the private key P and the private information K so that only the encrypting unit 53 has access. Since units other than the encrypting unit 53 cannot read the private key P and the private information K, leaking of the private key P and the private information K is prevented. The key management unit 51 and the private information management unit 52 can be configured to control access using a password or the biological information of an authorized user, for example, or configured using known tamper resistant technology.

The encrypting unit 53 can be configured by a CPU (processor) that encrypts the private information K using the private key P and a prescribed function. This prescribed function, when expressed as an equation, equates to EK=E'( ) such as E' (K,P). An algorithm based on common key encryption, public key encryption, a MAC or the like can be applied in E'( ), although E'( ) is described below as common key encryption.

The delivery unit 54 may be configured by a communication apparatus that communicates externally via a network, and delivery may be performed by a delivery system such as a truck or postal mail, via a medium such as a USB memory.

The control unit 55 controls the above processing.

(Encrypted Information Setting)

Figure 8:
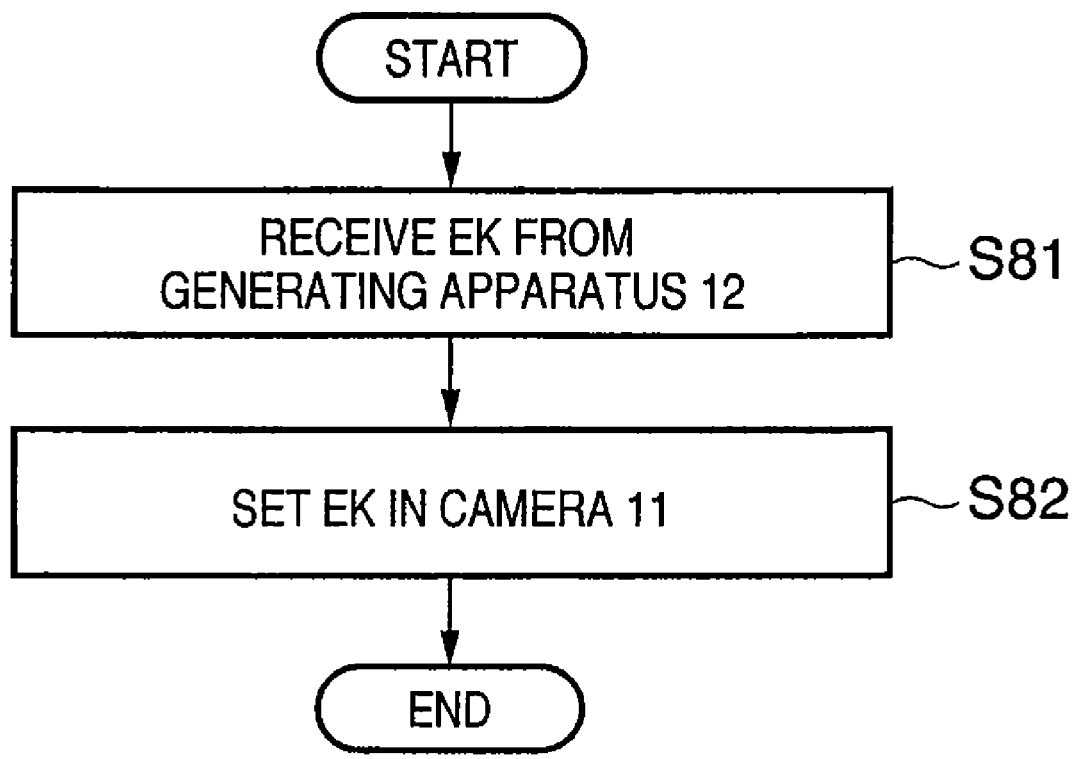
FIG. 8 is a flowchart showing the flow of encrypted information setting.

The procedure performed by the setting apparatus 13 to receive the encrypted private information EK from the generating apparatus 12 and set the above EK in the camera 11 is described next using FIG. 8. FIG. 8 is a flowchart showing the flow of encrypted information setting.

Figure 7:
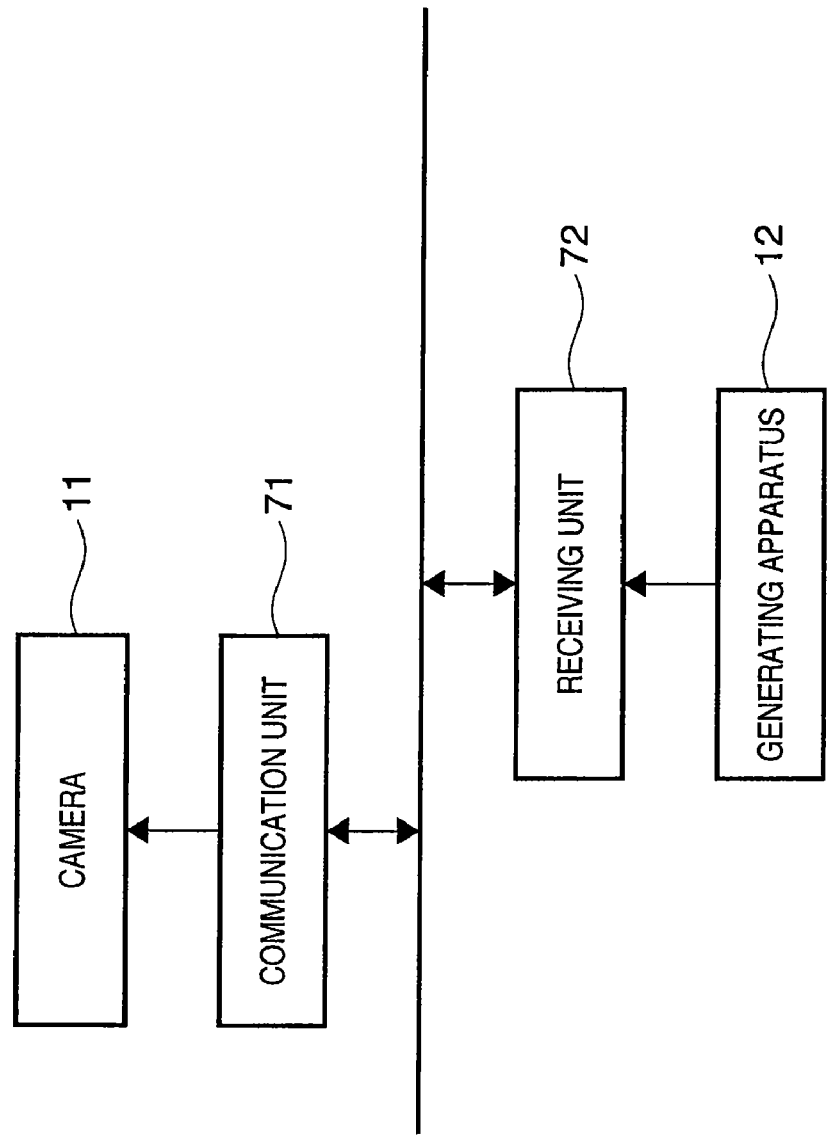
FIG. 7 is a block diagram schematically showing a detailed configuration of a private information setting mechanism.

Firstly, the setting apparatus 13 receives EK delivered from the generating apparatus 12 at a receiving unit 72 (step S81). Incidentally, the receiving unit 72 is one of the function elements of the private information setting mechanism (setting apparatus) 13. FIG. 7 is a block diagram schematically showing a detailed configuration of the private information setting mechanism (setting apparatus) 13. As shown in FIG. 7, the setting apparatus 13 is provided with a communication unit 71 for communicating with a camera, and the receiving unit 72 for receiving the encrypted private information EK from the generating apparatus 12.

The receiving unit 72 has a receiving apparatus compatible with the delivery unit 54. If the delivery unit 54 of the generating apparatus 12 delivers EK via a network, for example, the receiving unit 72 receives the encrypted private information EK via the network. Alternatively, if the delivery unit 54 delivers EK by postal mail, EK is received by receiving an item of mail.

Next, the communication unit 71 sets the received EK in the camera 11 (step S82). For example, the communication unit 71 writes EK received by the receiving unit 72 to a private information management unit 22 of the camera 11, with the setting apparatus 13 and the camera 11 connected by a network. Incidentally, the private information management unit 22 is a function element that manages private information, and can be realized, for example, by a nonvolatile memory apparatus such as a flash memory or an HD that implements tamper resistant technology for information leaks. Also, the connection between the setting apparatus 13 and the camera 11, not being limited to a network, also includes information transfer via a physical storage medium such as a USB memory or a memory card, for example.

(Private Information Recovery)

Figure 3:
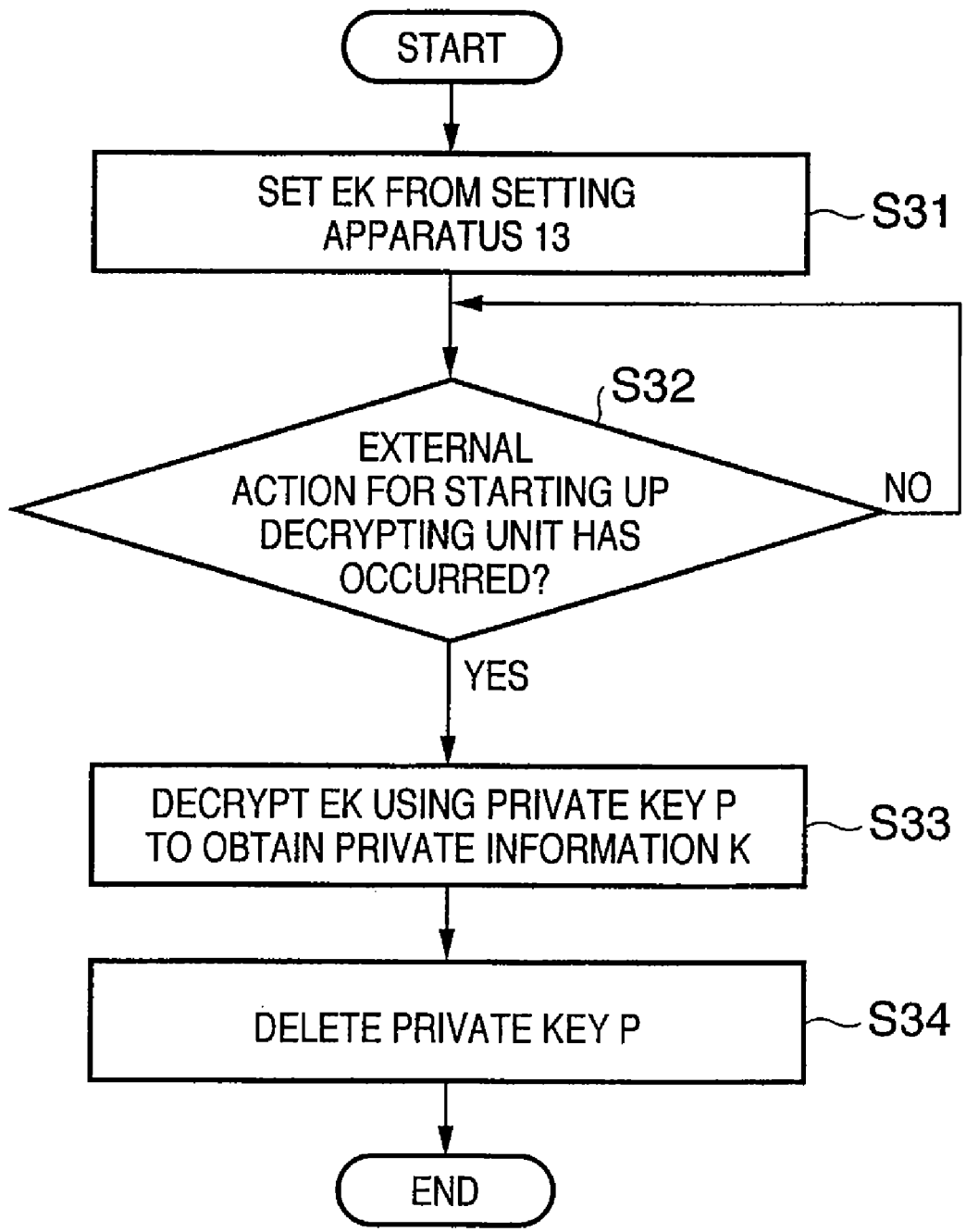
FIG. 3 is a flowchart showing the flow of private information recovery.

A processing procedure performed by the camera 11 relating to decrypting the encrypted private information EK and deleting the private key P used in the decryption is described next using FIG. 3. FIG. 3 is a flowchart showing the flow of private information recovery.

Figure 2:
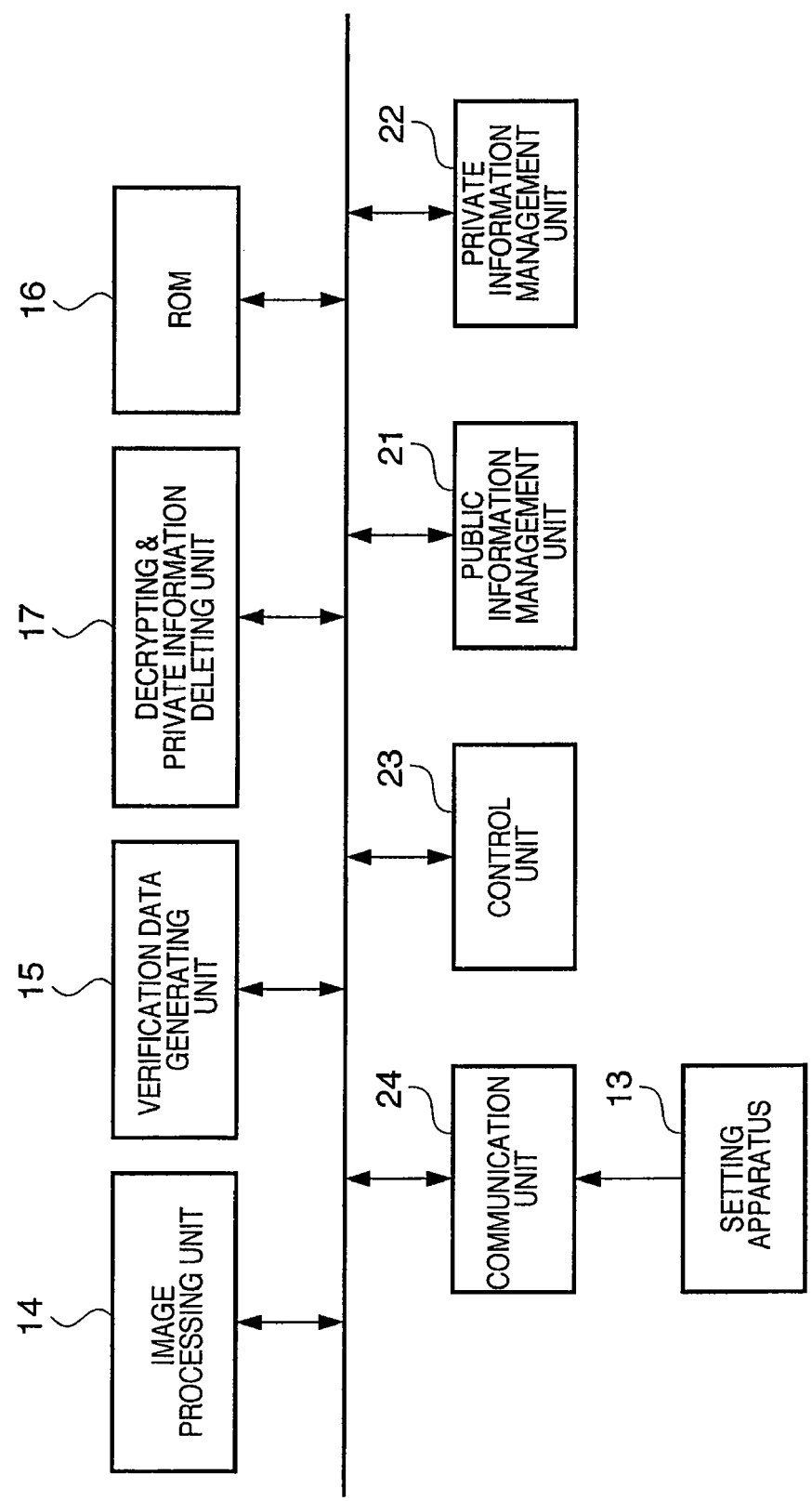
FIG. 2 is a block diagram schematically showing a detailed configuration of an image generating apparatus.

The camera 11 has, as a prerequisite for processing, a predetermined private key P in the ROM 16 shown in FIG. 2. This private key P is the same key as the private key P held by the generating apparatus 12. Note that FIG. 2 is a block diagram schematically showing a detailed configuration of the camera 11. The function elements configuring the camera (image generating apparatus) 11 are described together with the description of processing that uses these function elements.

The description now returns to FIG. 3. Firstly, the encrypted private information EK is set in the private information management unit 22 by the setting apparatus 13 via a communication unit 24 (step S31). Incidentally, the communication unit 24 is similar to the communication unit 71. That is, the communication unit 24 can be realized, for example, by a LAN card, a wireless LAN card, a wireless antenna or the like, as a communication interface for communicating with the setting apparatus 13 or the like. The communication unit 24 can also be realized, for example, by the media interface of a physical storage medium such as a USB memory of a memory card. Note that the setting of encrypted private information is performed, for example, by copying a file (EK) with a prescribed file name to a predetermined directory.

Next, in step S32, the decrypting & private information deleting unit 17 determines whether to start up a decrypting unit 102. Incidentally, the decrypting unit 102 is one of the function elements of the decrypting & private information deleting unit 17.

Figure 10:
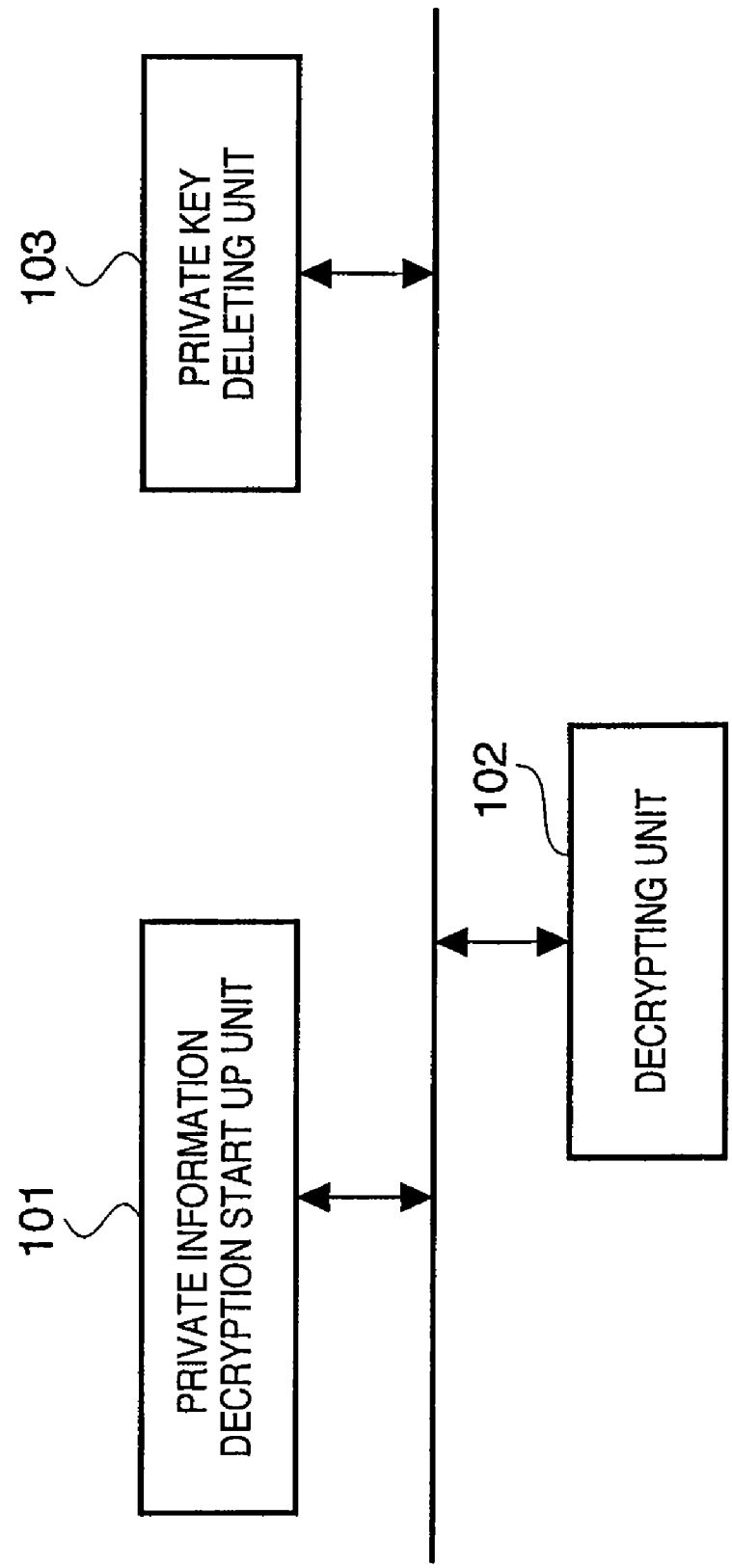
FIG. 10 is a block diagram showing a functional configuration of a decrypting & private information deleting unit.

Here, the functional configuration of the decrypting & private information deleting unit 17 is described with reference to FIG. 10. FIG. 10 is a block diagram showing the function elements of the decrypting & private information deleting unit 17. In FIG. 10, a private information decryption start up unit 101 determines whether to start up the decrypting unit 102. The decrypting unit 102 decrypts the encrypted private information EK. A private key deleting unit 103 deletes the private key P from the camera 11.

The decrypting & private information deleting unit 17 determines whether to start up the decrypting unit 102 in step 32 using the private information decryption start up unit 101. Incidentally, this determination is performed based on whether a predetermined action (event) has occurred externally. This action can be made to involve the input of a password or biological information externally via the communication unit 24 or an operation unit 94 of the image processing unit 14, and the private information decryption start up unit 101 recognizing the input information as being correct.

The validity of a password can be verified as follows, for example. That is, a password corresponding to the manufacturing number (serial number) of the camera 11 is preset in the camera 11, and a sheet (e.g., client registration card) containing the password is included in the product package when the camera 11 is shipped. If the password input by the user with reference to the client registration card or the like matches the preset password, a control unit 23 of the camera 11 judges the input password to be valid.

The validity of biological information can be verified as follows, for example. That is, the manufacturer of the camera 11 acquires the biological information (e.g., fingerprint information, voiceprint information, iris information) of a user in advance, and sets the biological information of the user in the camera 11 when the camera 11 is provided to that user. If biological information input by a user matches the preset biological information, the control unit 23 of the camera 11 judges the input biological information to be valid.

Note that the action is, needless to say, not limited to these actions. Note that security is generally bolstered by making the action a unique operation not often performed in normal operations.

If it is not judged in step S32 to start up the decrypting unit 102 (step S32: NO), the processing waits for the action to occur. If the action occurs (step S32: YES), the processing proceeds to step S33.

At step S33, the decrypting unit 102 executes processing to decrypt the encrypted private information EK. The decrypting unit 102 firstly acquires the encrypted private information EK held in the private information management unit 22. Next, the decrypting unit 102 decrypts EK using the private key P held in the ROM 16. The private information K is acquired as a result of the above processing. K is stored in the private information management unit 22 as private information for use in creating verification data.

After executing the processing of step S33, the private key deleting unit 103 of the decrypting & private information deleting unit 17 immediately executes processing to delete the private key P (step S34). The private key deleting unit 103 deletes or destroys the private key P in the camera 11 by overwriting the data area corresponding to the private key P held in the ROM 16 using a prescribed value or a random value. Alternatively, if the ROM 16 holding the private key P has a function of invalidating access to a prescribed memory area, access to the memory area holding the private key P may be invalidated. Either way, the private key deleting unit 103 makes the private key P unusable. Private information recovery is then ended.

Incidentally, the ROM 16 and the private information management unit 22 are memories configured so as to prevent reading to external units other than the decrypting unit 102, so that the private key P and the private information K are not divulged. The ROM 16 and the private information management unit 22 can be configured using tamper-resistant technology, for example. They may also be configured to perform authentication based on a password or the biological information of an authorized user, and to only enable referencing from outside if the validity of the user is confirmed.

Executing private information recovery as described above makes it possible to securely record the private information K generated by the generating apparatus 12 to the private information management unit 22 in the image generating apparatus 11. In other words, encrypting the private information K in the generating apparatus 12 using the private key P enables eavesdropping between the generating apparatus 12 and the image generating apparatus 11 by a malicious aggressor to be prevented.

Also, deleting the private key P used in decrypting the private information K from the image generating apparatus 11 after the decryption prevents the private key P from being acquired even if a malicious aggressor attempts to acquire the private key P from the image generating apparatus 11.

If the private key P in the image generating apparatus 11 is not deleted, there is a possibility of a malicious aggressor being able to obtain the private key P by analyzing the ROM 16. An aggressor who acquires the private key P will be able to easily acquire the private information K by acquiring the encrypted private information EK communicated between the generating apparatus 12 and the image generating apparatus 11, and decrypting the encrypted private information EK using the private key P.

In the present embodiment, the private key P holds a value common among all the image generating apparatuses 11, as described above. As a result, an aggressor who has acquired the private key P in principle becomes able to acquire the private information K corresponding to all the image generating apparatuses 11. To solve this problem, the private key P is deleted from the image generating apparatus 11 according to the present embodiment, after setting the private information K. This makes acquiring the private key P most difficult.

The decrypting unit 102 implements a decryption function of the encrypting unit 53, and decrypts the encrypted private information EK using the private key P. The decrypting unit 102 can be configured, for example, by a CPU. Note that the decryption function, when express as an equation, indicates $K=D'(\ )$ such as $D'(EK,P)$.

The control unit 23 executes processing by controlling the above function elements.

(Verification Data Generation)

Figure 4:
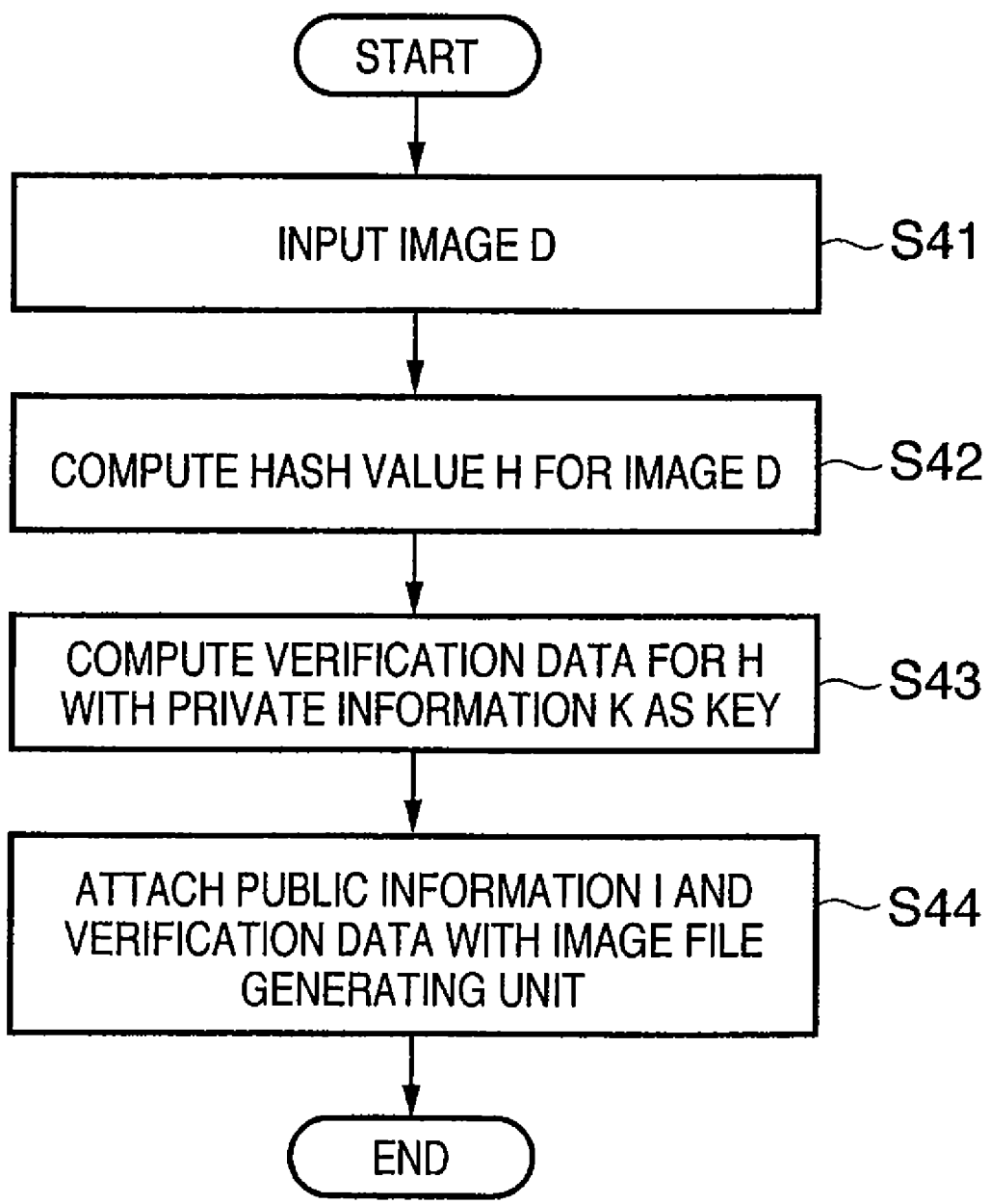
FIG. 4 is a flowchart showing the flow of verification data generation.

Next, processing performed by the camera 11 to generate verification data M for an image D is described using FIG. 4. FIG. 4 is a flowchart showing the flow of verification data generation.

Firstly, the camera 11 inputs an image (image data) D from an image capturing unit 91 of the image processing unit 14 (step S41). The image capturing unit 91 is a function element of the image processing unit 14.

Figure 9:
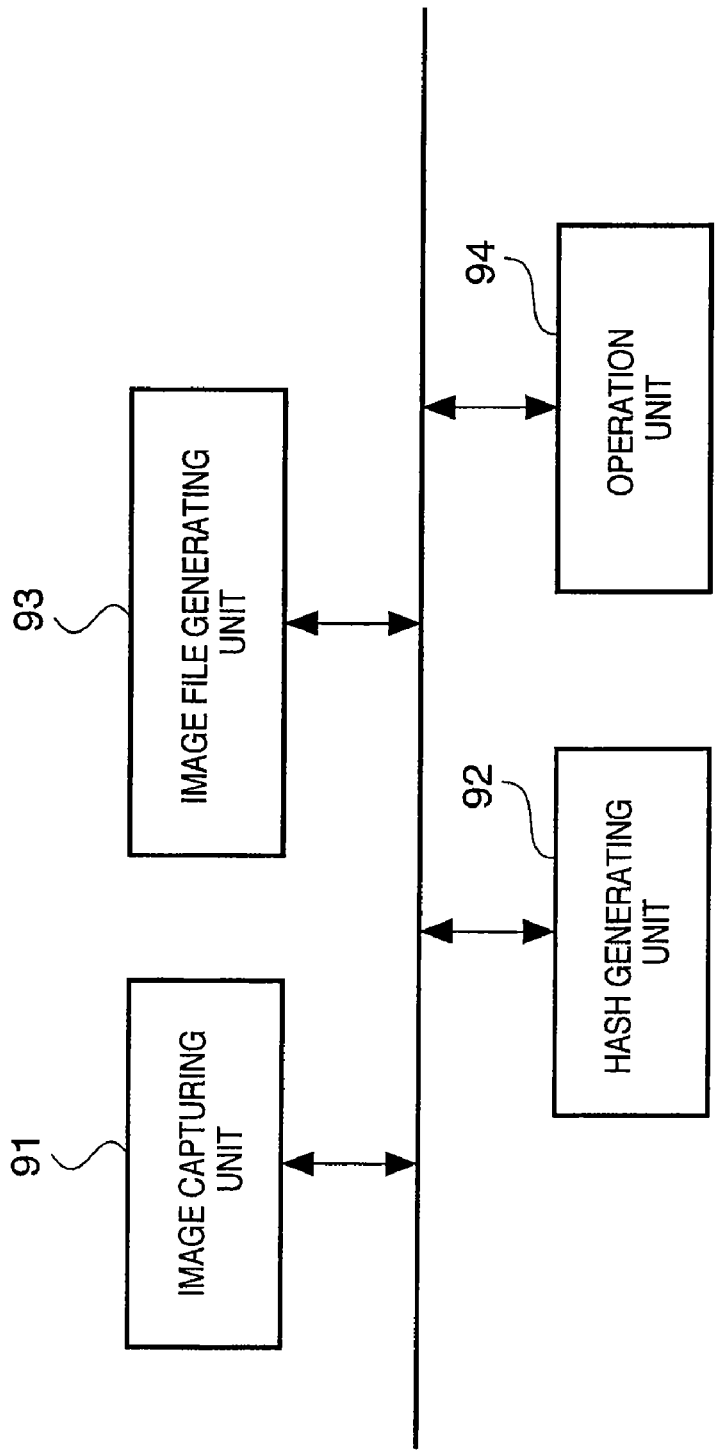
FIG. 9 is a block diagram showing a functional configuration of an image processing unit.

Here, the functional configuration of the image processing unit 14 is described with reference to FIG. 9. FIG. 9 is a block diagram showing the functional configuration of the image processing unit 14.

In FIG. 9, the image capturing unit 91 has an optical sensor such as a CCD (charge-coupled device), and generates image data of a subject and auxiliary parameters based on instructions input to an operation unit 94.

A hash generating unit 92 performs a hash calculation on the instructed data and acquires a hash value. The hash calculation executed by the hash generating unit 92 can be performed based on a known hash function, for example. MD5, SHA1, RIPEMD and the like are commonly known hash functions.

An image file generating unit 93 generates an image file in a prescribed file format based on the image obtained from the image capturing unit 91. The file generated by the image file generating unit 93 can, for example, utilize a known file format. For example, JPEG, JFIF, TIFF, GIF, extensions of these, or other image file formats can be used. Incidentally, JPEG is the abbreviation for Joint Photographic Experts Group. JFIF is the abbreviation for JPEG file Interchange Format. TIFF is the abbreviation for Tagged Image File Format. GIF is the abbreviation for Graphic Interchange Format.

The operation unit 94 is a user interface that receives input of user instructions, and is realized, for example, by an operation button, a switch, a jog dial, a touch panel or the like.

The description now returns to FIG. 4. Once the processing of step S41 has ended, a hash value H for the image D is computed in step S42. Incidentally, the hash value H is computed using the hash generating unit 92, which is one of the function elements of the image processing unit 14.

Next, in step S43, verification data for the hash value H is computed in the verification data generating unit 15, with the above K held in the private information management unit 22 as a key. Incidentally, algorithms usable by the verification data generating unit 15 include, for example, a digital signature scheme based on a public key encryption scheme, or a MAC scheme, as described above. Digital signature information is generated according to a digital signature scheme, while MAC information is generated according to a MAC scheme.

Next, in step S44, the control unit 23 of the camera 11 performs a control so that the image file generating unit 93 of the image processing unit 14 attaches the verification data generated at step S43 and the public information I to the image file of the image D. Incidentally, the public information I, as mentioned above, is public information unique to the camera 11, and is held in a public information management unit 21. Note that the public information management unit 21 is a function element that manages the public information I, and can be configured, for example, by the nonvolatile memory such as a flash memory or an HD. I is obtained from an external source via the communication unit 24. The control unit 23 controls the processing of the above steps. The processing is then ended.

Note that known signature generation algorithms of public key encryption include RSA (Rivest Shamir Adleman) and DSS (Digital Signature Standard). Known algorithms for generating MAC data include a method using the CBC (Cipher Block Chaining) mode of common key encryption such as DES or AES, and a method using a keyed hash function called HMAC. Incidentally, DES is the abbreviation for Data Encryption Standard. AES is the abbreviation for Advanced Encryption Standard. HMAC is the abbreviation for Keyed-Hashing for Message Authentication Code. For example, if the DES CBC mode is used, targeted data is encrypted with the CBC mode, and the first 32 bits of the last block of the encrypted data are used as MAC data.

In the example described above, the verification data generating unit 15 generates verification data M for the shot image data D using the private information K set in the camera 11. However, the present invention is not limited to this, it being obvious that the private information K set in the camera 11 is applicable in a variety of processing. In this case, the verification data generating unit 15 should be considered capable of executing the variety of processing using the private information K.

Figure 20:
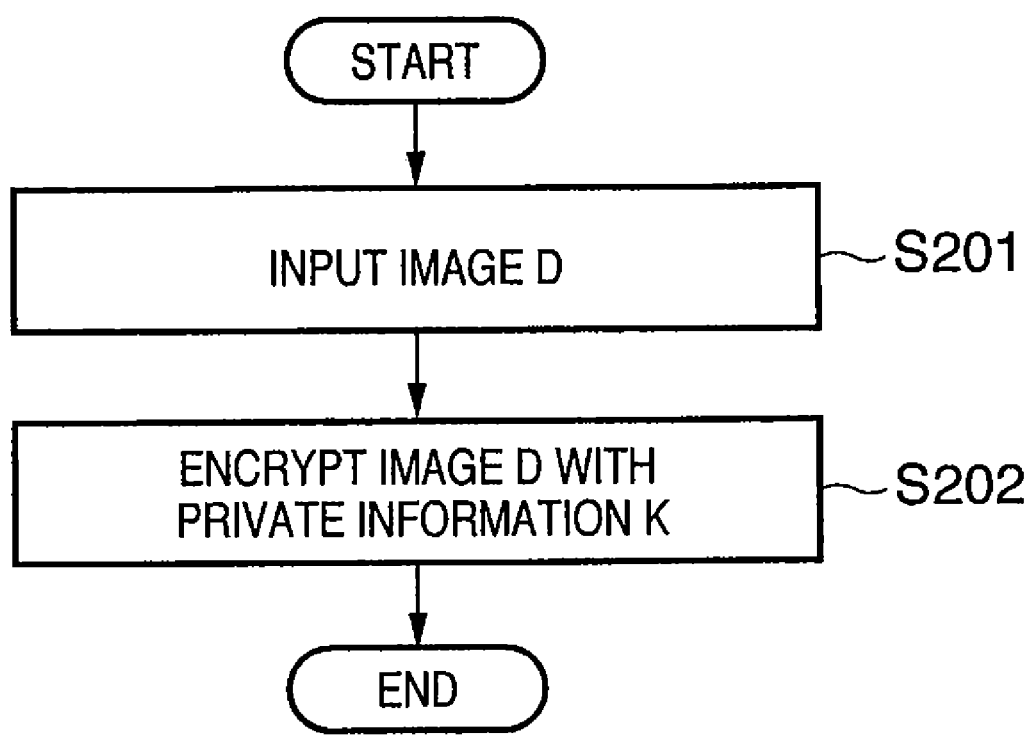
FIG. 20 is a flowchart showing the flow of processing when encrypting the shot image data.

Processing for encrypting the shot image data D using the private information K set in the camera 11, for example, is described using FIG. 20. FIG. 20 is a flowchart showing the flow of processing when encrypting the shot image data D.

Firstly, the camera 11 inputs an image (image data) D from the image capturing unit 91 of the image processing unit 14 (step S201). Note that a detailed description of step S201, which can be performed similarly to the above step S41, is omitted.

Once the processing of step S201 has ended, the image data D input in step S201 is encrypted, with the private information K held in the private information management unit 22 as a key. The encryption algorithm includes common key schemes such as AES and DES, and public key schemes such as RSA, for example. The encrypted image data is then output.

Figure 21:
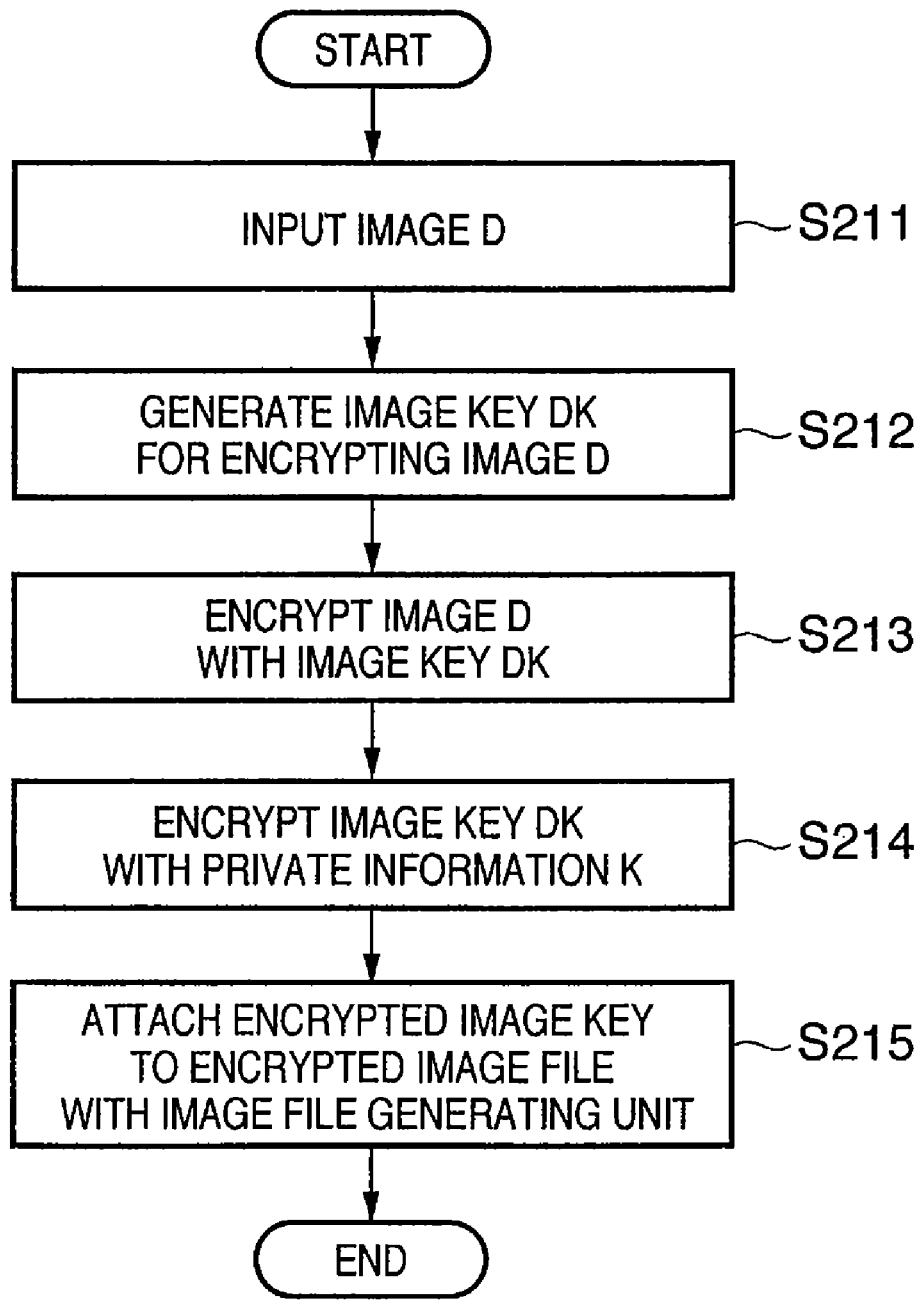
FIG. 21 is a flowchart showing the flow of processing when encrypting the image key.

Alternatively, rather than encrypting the image D directly using the private information K, the image D may be encrypted with an image key generated separately, and the image key may be encrypted using the private information K. Processing to encrypt the image key is described using FIG. 21. FIG. 21 is a flowchart showing the flow of processing when encrypting the image key.

Firstly, the camera 11 inputs an image (image data) D from the image capturing unit 91 of the image processing unit 14 (step S211). Note that a detailed description of step S211, which can be performed similarly to the above step S41, is omitted.

Once the processing of step S211 has ended, an image key DK for encrypting the image D is generated in step S212. The image key should be a value that differs for each image, with pseudo random numbers generated using a pseudo random number generator (not shown), or hash values of the image D being applicable, for example. After generating the image key DK at step S212, the image D input at step S211 is encrypted using the image key DK generated at step S212 (step S213). The image key DK is then encrypted, with the private information K held in the private information management unit 22 as a key (step S214). Finally, in step S215, the control unit 23 of the camera 11 performs a control so that the image file generating unit 93 of the image processing unit 14 attaches the image key encrypted at step S214 to the file of the image encrypted at step S213. Note that the encryption algorithms adapted at steps S213 and S214 are not especially limited, with AES, DES or the like being applicable as common key schemes, and RSA or the like being applicable as public key schemes, for example.

As described above, the image generating apparatus 11, as an information processing apparatus according to the present invention, inputs encrypted private information and decrypts the private information in the camera, thereby enabling the confidentiality of private information to be ensured even if the case where information channels external to the camera are not secure. Also, the camera 11 deletes key information used in the decryption from memory together with decrypting the private information, thereby enabling security with regard to the leaking of decryption keys to be bolstered.

In the present embodiment, the camera 11 performs controls to input encrypted private information and decrypt the private information in the camera, and to delete the decryption key used in the decryption from memory. The camera 11 then uses the decrypted private information to generate information (digital signature, MAC or other verification data) used in detecting falsification of shot image data. As described above, security with regard to the leaking of decryption keys is bolstered in the configuration according to the present embodiment, thereby enabling the reliability of information used in detecting falsification of image data to be bolstered.

Also, in the present embodiment, the camera 11 decrypts private information and deletes key information used in the decryption, in response to a prescribed event such as the input of valid password information or valid biological information. Security with regard to the leaking of decryption keys is thus further bolstered.

(Modifications)

The above embodiment was described in terms of the generating apparatus 12 being realized by a PC, although the generating apparatus 12 can also be realized by a tamper resistant apparatus such as an IC card. In this case, the IC card, as the generating apparatus 12, is connected to a PC, as the setting apparatus 13, and data such as the encrypted private information EK is communicated between the IC card and the PC.

Also, the above embodiment is configured so that a password, biological information or the like is input externally, and the decrypting & private information deleting unit 17 executes decryption and private information deletion, with recognition of the input information as being correct information (i.e., user authentication is successful) as the action. However, the present invention is not limited to this, and may be configured so that the pressing of a prescribed button displayed on a monitor or the selection of a prescribed menu using a mouse or keyboard (not shown) on the setting apparatus 13 is the action. In this case, the series of processing shown in FIG. 3 (S31, S33 and S34) is automatically executed by the user pressing a prescribed button.

Alternatively, the setting apparatus 13 may constantly monitor whether the image generating apparatus 11 is connected to the setting apparatus 13, with confirmation of a connection being the action. In this case, the series of processing shown in FIG. 3 (S31, S33 and S34) is automatically executed by connecting the image generating apparatus 11 to the setting apparatus 13.

Second Embodiment

In the first embodiment, the confirmation of the validity of a password or biological information input externally was shown as an example of an action that triggers the execution of the decrypting & private information deleting unit 17 in the camera 11. However, it is conceivable that usability is impaired because of the operations for inputting passwords or the like differing from normal operations. Note that verification data cannot be created as long as decryption and private key deletion has not been executed, as mentioned above. Thus, in the configuration according to the present embodiment, an operation that is definitely performed on the camera 11 is made the trigger for executing decryption and private key deletion, given that it is sufficient if verification data can created before the user first takes a shot. This enables usability to be improved.

Since the configuration according to the present embodiment is largely similar to the configuration according to the first embodiment, only the differences from the configuration according to the first embodiment are described. Description of the configuration and operation of the generating apparatus 12, being the same as those shown in FIGS. 5 and 6, and the configuration and operation of the setting apparatus 13, being the same as those shown in FIGS. 7 and 8, is omitted. The configuration of the image generating apparatus (camera) 11, as an information processing apparatus according to the present embodiment, is similar to FIG. 2. Also, similarly to the first embodiment, the camera 11 has a predetermined private key P in the ROM 16 shown in FIG. 2. This private key P is the same private key P held by the generating apparatus 12.

Figure 11:
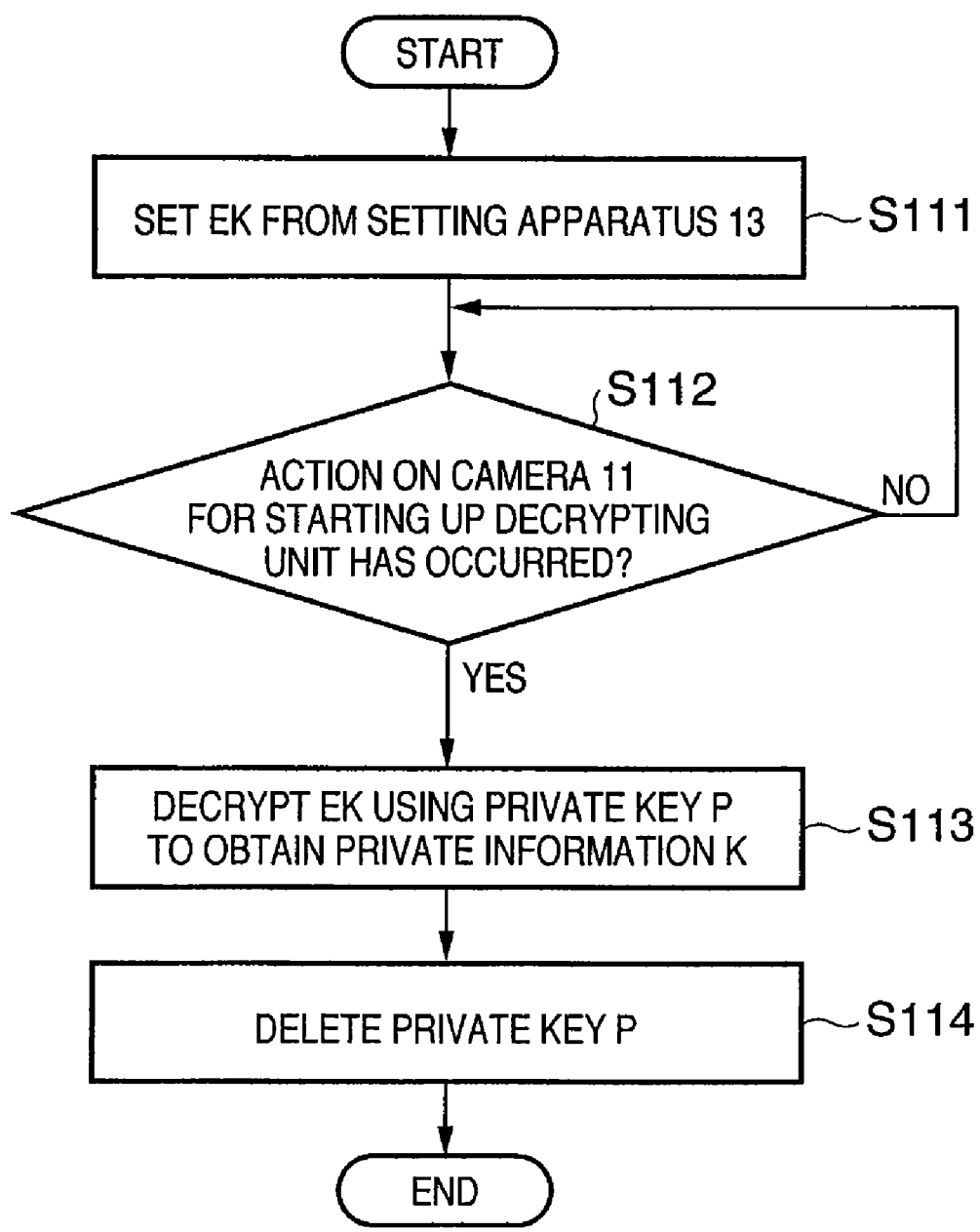
FIG. 11 is a flowchart showing the procedure of processing executed by the image generating apparatus in the second embodiment.

The processing procedure relating to decryption of the encrypted private information EK and deletion of the private key P used in the decryption is described below using FIG. 11. FIG. 11 is a flowchart showing the procedure of processing executed by the camera (information generating apparatus) 11 in the present embodiment.

Firstly, the encrypted private information EK is set in the private information management unit 22 via the communication unit 24 by the setting apparatus 13 (step S111). Incidentally, the communication unit 24 is similar to the communication unit 71.

Next, in step S112, the decrypting & private information deleting unit 17 determines whether to start up the decrypting unit 102. This determination is performed based on whether an operation (action) preregistered in the private information decryption start up unit 101 that is always performed on the camera 11 has been executed. This operation can, for example, be the initial power-on of the camera 11 or the initial pressing of the shutter of the camera 11. Alternatively, if the image generating apparatus 11 is realized as a scanner, the above operation can be the initial power-on of the scanner 11 or the initial pressing of the start button of the scanner 11. Alternatively, the operation may be the setting of EK in the camera 11 by the setting apparatus 13 using the communication unit 24.

If it is not judged in step S112 to start up the decrypting unit 102 (step S112: NO), the processing waits for the action to occur. If the action occurs (step S112: YES), the processing proceeds to step S113.

At step S113, the decrypting unit 102 executes processing to decrypt the encrypted private information EK. The decrypting unit 102 firstly acquires the encrypted private information EK held in the private information management unit 22. Next, the decrypting unit 102 decrypts EK using the private key P held in the ROM 16. The private information K is acquired as a result of the above processing. K is stored in the private information management unit 22 as private information for use in creating verification data.

After executing the processing of step S113, the private key deleting unit 103 of the decrypting & private information deleting unit 17 executes processing to delete the private key P (step S114). The private key deleting unit 103 deletes the private key P from the camera 11 by overwriting memory or the like. The processing is then ended.

Note that description of the generation of verification data M for the image D in the camera 11 (verification data generation), which is shown in FIG. 4 similarly to the first embodiment, is omitted.

As described above, the image generating apparatus 11, as an information processing apparatus according to the present embodiment, decrypts private information and deletes key information used in the decryption, in response to an event that occurs in normal operations such as an initial power-on, or the initial operation of a predetermined input apparatus. The configuration according to the present embodiment thus enables usability to be improved while maintaining security.

Third Embodiment

Firstly, an outline of the processing of the configuration according to the first and second embodiments is summarized with reference to FIG. 12. FIG. 12 is a block diagram schematically showing an outline of the processing of the configuration according to the first and second embodiments.

As described above, the generating apparatus 12 generates the private information K by inputting the public information I and the private key P' into the function E( ), and encrypts the generated K using the private key P to create the private information EK. Next, the generating apparatus 12 delivers EK to the setting apparatus 13 via a channel whose security is not guaranteed.

The setting apparatus 13, on receipt of the encrypted private information EK, sets EK in the camera 11.

Finally, the camera 11, when triggered by a prescribed action, performs controls to decrypt EK using the private key P and acquire the private information K, and to delete the private key P from memory.

In this way, private information in a channel whose security is not guaranteed is encrypted in the above configuration, thereby ensuring that the private information is not leaked. Also, private information K is securely managed, since the camera 11 performs a control to delete the private key P once the private key P has been used.

Note that E'( ) and D'( ) in FIG. 12 are respectively the same as E'( ) and D'( ) mentioned in the description of the encrypting unit 53 and the decrypting unit 102.

Figure 13:
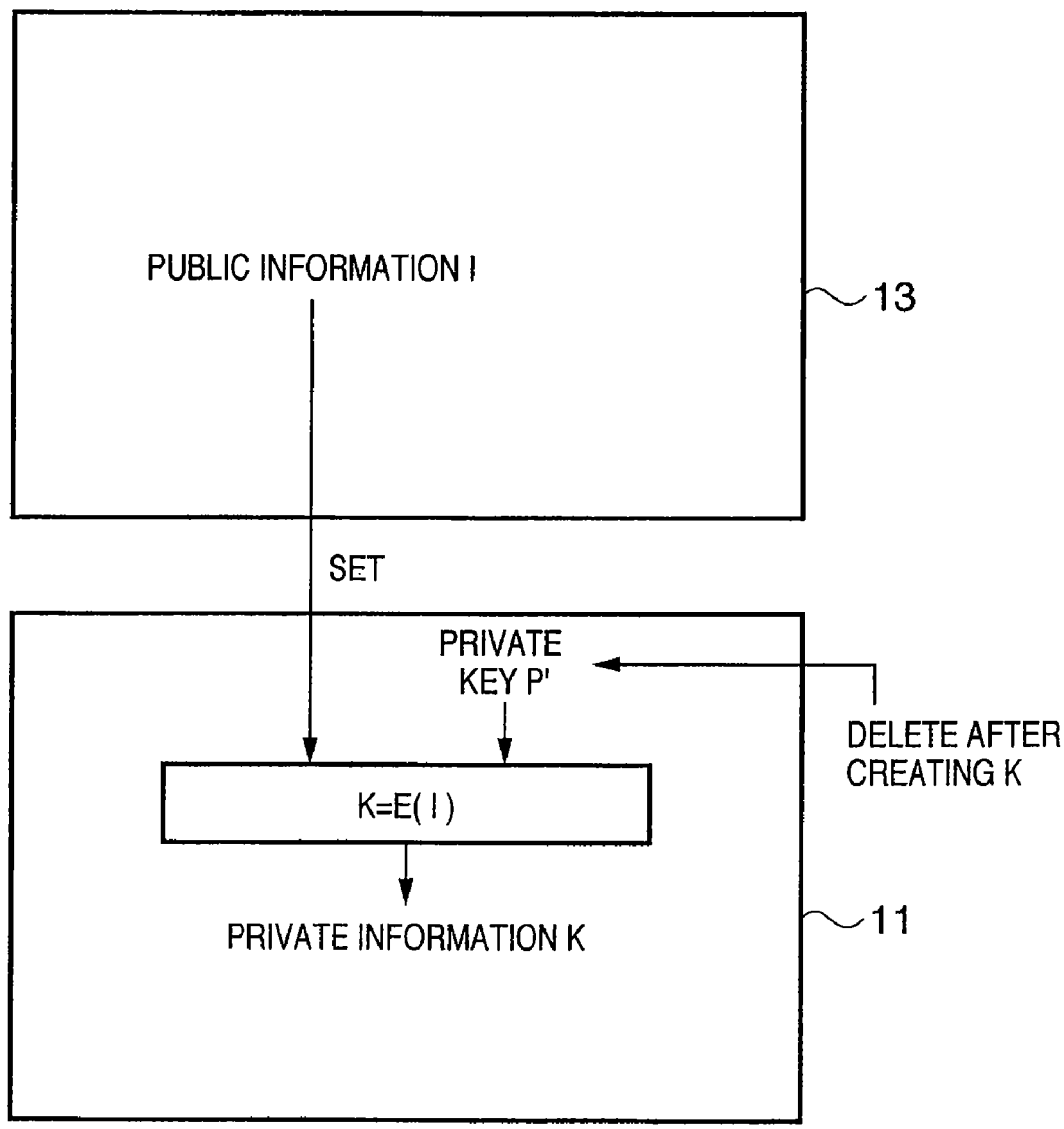
FIG. 13 is a block diagram schematically showing an outline of the processing of the configuration according to a third embodiment.

The configuration according to the present embodiment is shown schematically in FIG. 13, in contrast to the above configuration. FIG. 13 is a block diagram schematically showing an outline of the processing of the configuration according to the present embodiment.

As shown in FIG. 13, in the present embodiment there basically exists only an image generating apparatus (camera) 11 as an information processing apparatus according to the present embodiment, and a private information setting mechanism (setting apparatus) 13. The setting apparatus 13 sends to the camera 11 the public information I corresponding to the camera 11, as shown in FIG. 13. The camera 11 performs controls to execute the function E( ), with the sent public information I and the private key P' as inputs, and acquire the private information K, and to delete the private key P'. Incidentally, the private key P' is assumed to be preset in the camera 11.

According to this configuration, information used in detecting falsification can be set without performing encryption, and security with regard to the leaking of key information can be bolstered since key information is deleted from the camera together with the encryption of public information.

Since the configuration according to the present embodiment is largely similar to the configuration according to the first and second embodiments, only the differences from the configuration according to these embodiments will be described.

(Apparatus Configuration)

Figure 14:
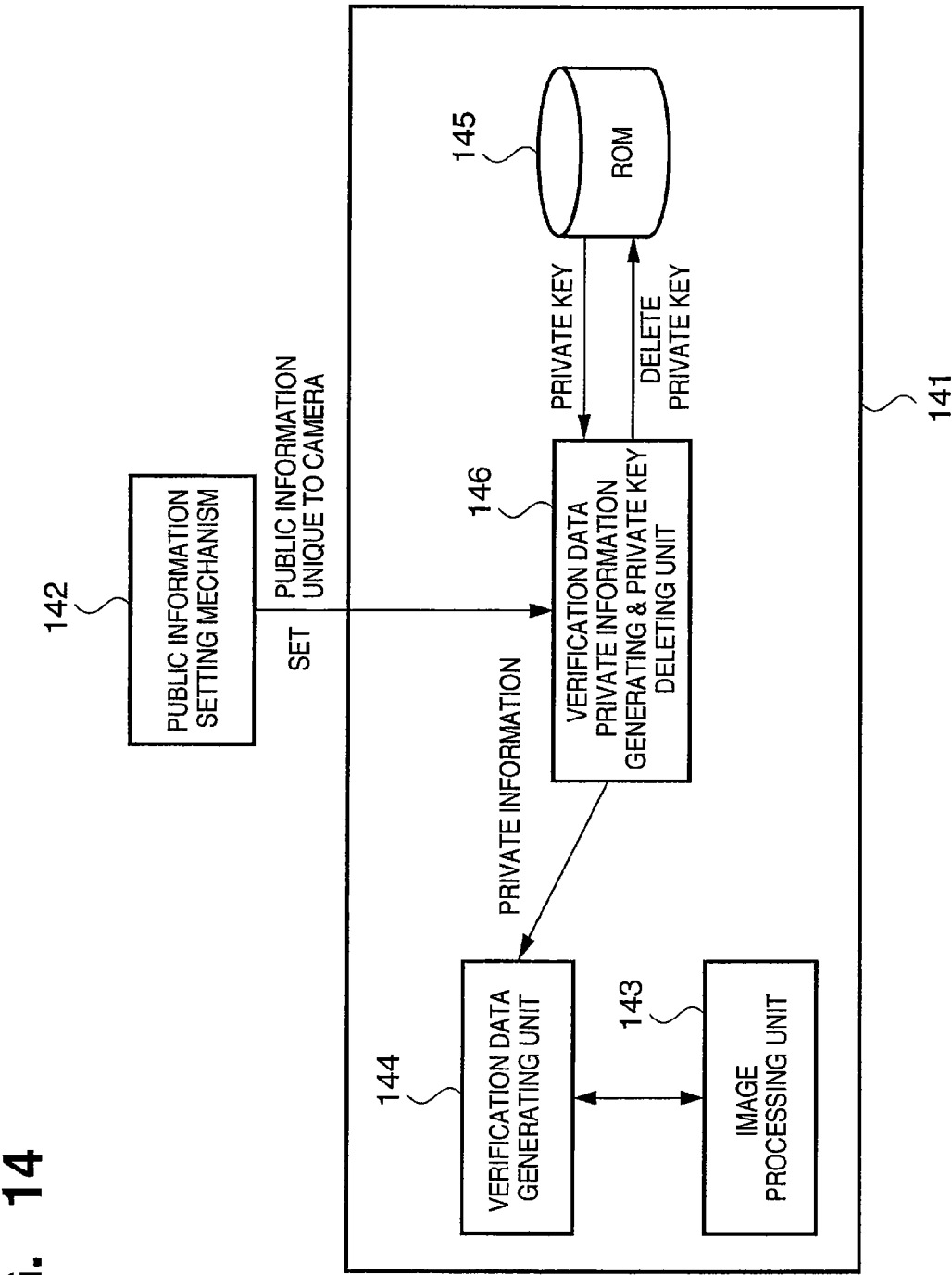
FIG. 14 is a block diagram showing an exemplary system configuration that includes an information processing apparatus according to the third embodiment.

FIG. 14 is a block diagram showing an exemplary system configuration that includes an information processing apparatus according to the present embodiment. As shown in FIG. 14, in the present embodiment there exists an image generating apparatus (camera) 141 and a public information setting mechanism (public information setting apparatus) 142.

As shown in FIG. 14, the image generating apparatus 141 basically has a function of communicating with an image processing unit 143, a verification data generating unit 144, a ROM 145, and a verification data private information generating & private key deleting unit 146. The verification data private information generating & private key deleting unit 146 has a function of computing and outputting the private information K, with the public information I input from the public information setting apparatus 142 and the private key P' in the ROM 145 as inputs in the function E( ). The verification data private information generating & private key deleting unit 146 further has a function of determining the first time that the private information K is created, and a function of deleting the private key P' from the ROM 145 after this initial execution.

Description of the other function elements (image processing unit 143, verification data generating unit 144, ROM 145 etc.) in FIG. 14, which are similar to FIG. 2, is omitted. Note that the image generating apparatus 141 may be an image capturing apparatus such as a digital camera, a digital video camera or a scanner, or an electronic device that has a camera unit, although it is described below as a camera 141 for the sake of simplicity.

The public information setting mechanism 142 has a function of setting the public information I unique to the camera in the camera 11. Note that the public information setting mechanism 142 may sets the public information I directly in the camera 11 manually, or be a configuration such as a PC having a function of setting the public information I in the camera 11 via a USB memory or a network. Hereinafter, the public information setting mechanism 142 is assumed to be realized by a PC, and is referred to in the following description as the public information setting apparatus 142.

Figure 18:
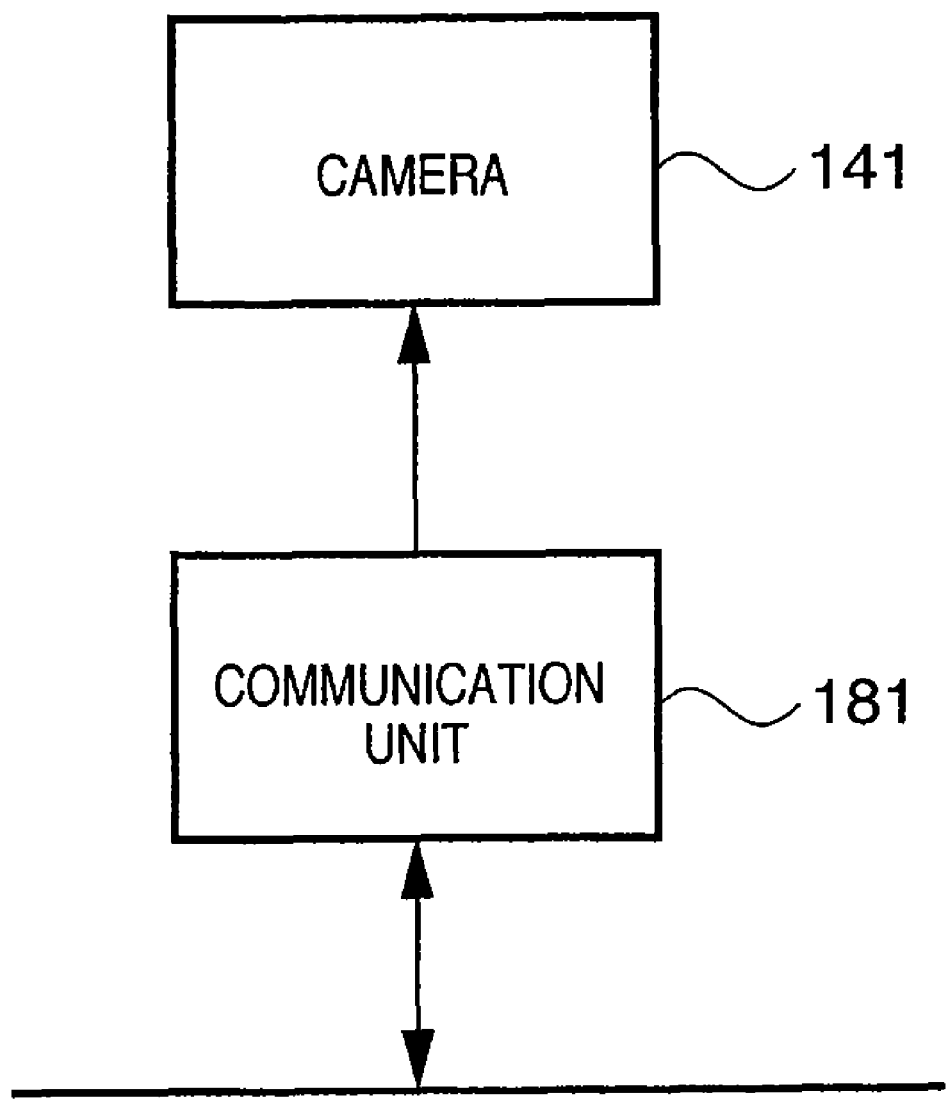
FIG. 18 is a block diagram schematically showing a detailed configuration of a public information setting apparatus.

Here, the functional configuration of the public information setting apparatus 142 is described with reference to FIG. 18. FIG. 18 is a block diagram schematically showing a detailed configuration of the public information setting apparatus. In FIG. 18, a communication unit 181 is a function element that functions as a communication interface with external apparatuses including the camera 141. The public information setting apparatus 142 sets the public information I in the camera 141 via the communication unit 181.

(Public Information Setting)

Figure 19:
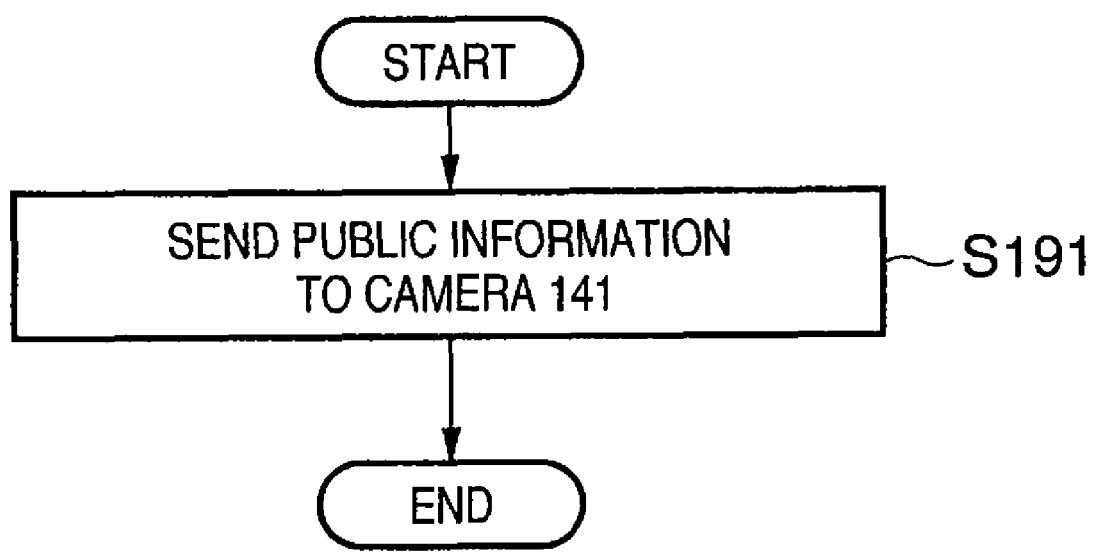
FIG. 19 is a flowchart showing the flow of public information setting.

Next, public information setting executed by the public information setting apparatus 142 is described with reference to FIG. 19. FIG. 19 is a flowchart showing the flow of public information setting.

The public information setting apparatus 142 sends the public information I to the camera 141 using the communication unit 181, as shown in FIG. 19 (step S191). The communication unit 181 is similar to the communication unit 71.

(Private Information Recovery)

Figure 15:
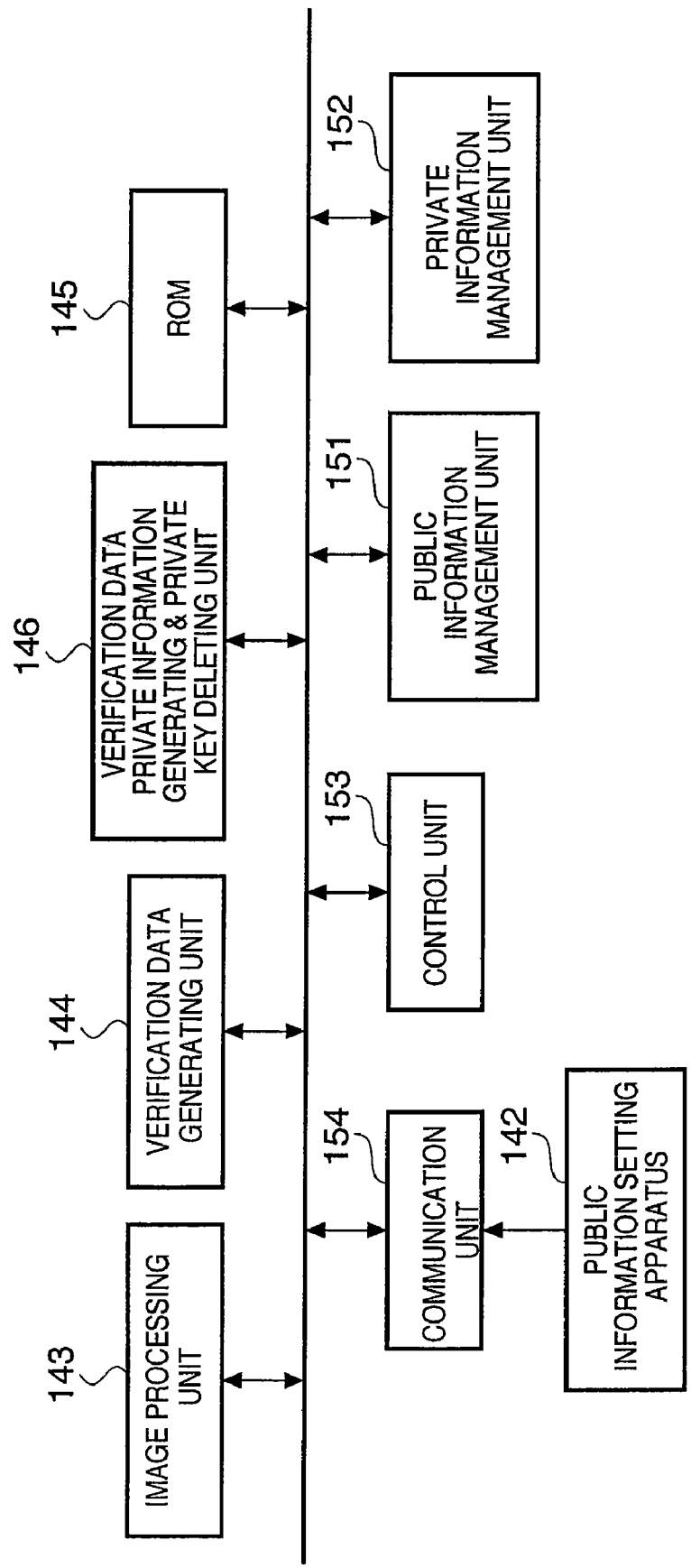
FIG. 15 is a block diagram schematically showing a detailed configuration of a camera.

The camera 141, as a prerequisite for processing, is assumed to have the predetermined private key P' in the ROM 145, as shown in FIG. 15. Incidentally, FIG. 15 is a block diagram schematically showing a detailed configuration of the camera 141. Description of the function elements in FIG. 15 apart from the verification data private information generating & private key deleting unit 146, which are similar to function elements shown in FIG. 2, is omitted.

This private key P' is used as an input for creating the private information K unique to the camera 141, as described above. The verification data private information generating & private key deleting unit 146 has a function of computing and outputting the private information K, with the public information I input from the public information setting apparatus 142 and the private key P' in the ROM 145 as inputs in the function E( ). The verification data private information generating & private key deleting unit 146 further has a function of determining the first time that the private information K is created, and a function of deleting the private key P' from the ROM 145 after this initial execution.

Figure 17:
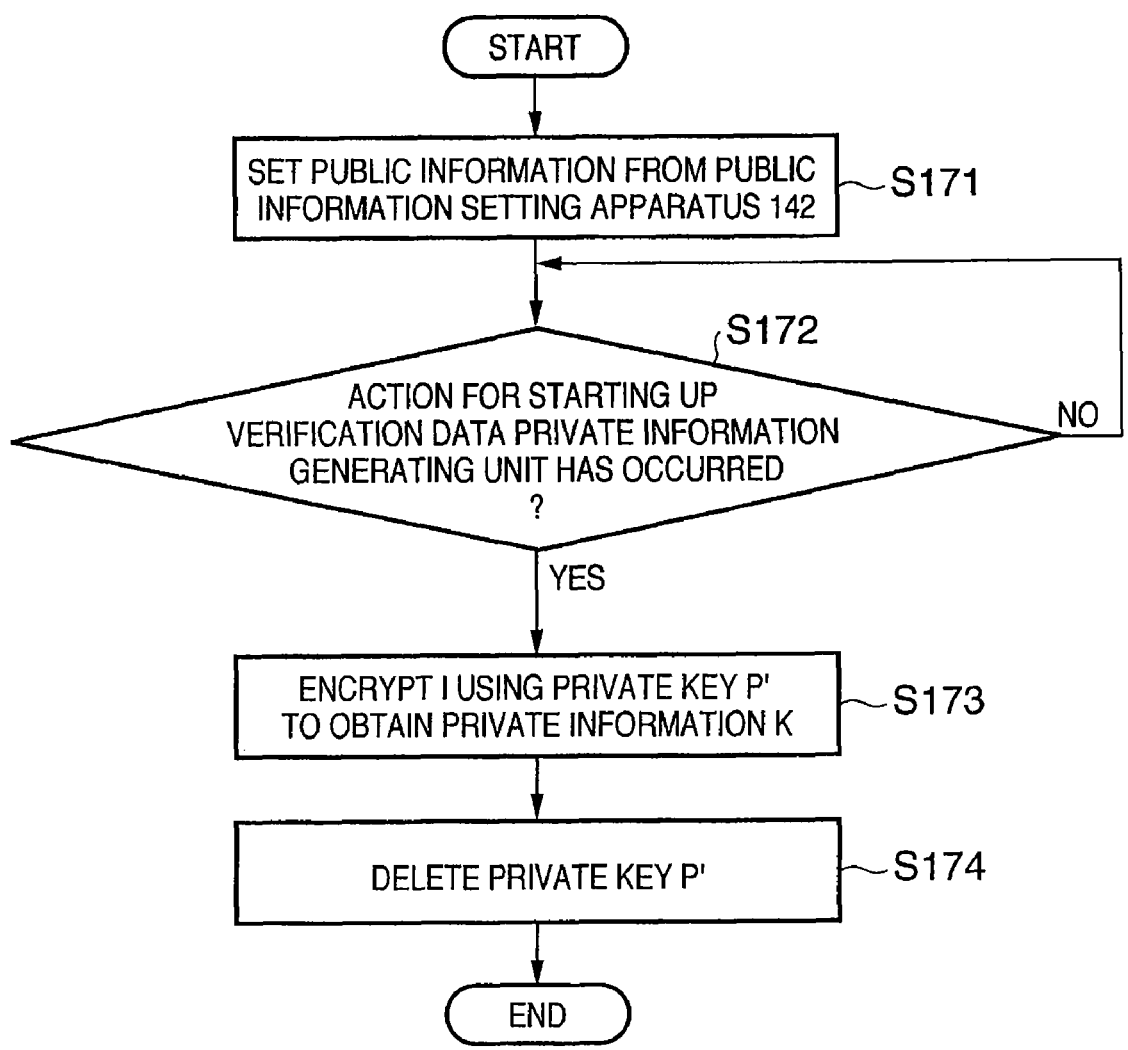
FIG. 17 is a flowchart showing the flow of private information recovery.

The processing procedure relating to the creation of the private information K and the deletion of the private key P' for use in creating the private information K in the camera 141 is described next using FIG. 17. FIG. 17 is a flowchart showing the flow of private information recovery executed by the camera 141.

Firstly, the public information setting apparatus 142 sets the public information I in the public information management unit 151 via the communication unit 154 (step S171).

Next, in step S172, the verification data private information generating & the private key deleting unit 146 determines whether to start up a verification data private information generating unit 162. Note that the verification data private information generating unit 162 is one of the function elements of the verification data private information generating & the private key deleting unit 146.

Figure 16:
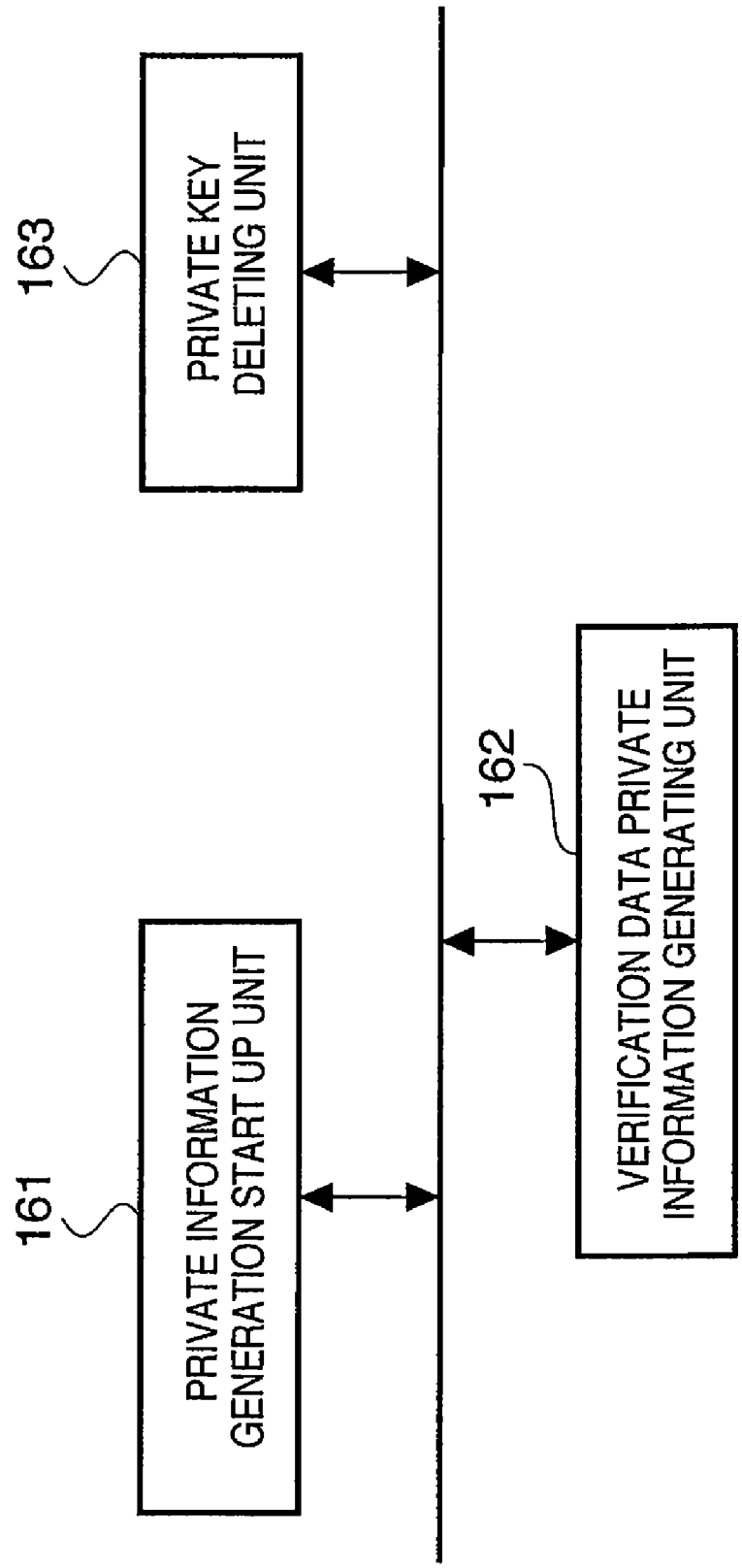
FIG. 16 is a block diagram showing a functional configuration of a verification data private information generating & private key deleting unit.

Here, the functional configuration of the verification data private information generating & the private key deleting unit 146 is described with reference to FIG. 16. FIG. 16 is a block diagram showing the functional configuration of the verification data private information generating and private key deleting unit 146.

In FIG. 16, a private information generation start up unit 161 performs processing to determine whether to start up the verification data private information generating unit 162. The verification data private information generating unit 162 performs processing to generate private information for use in creating verification data, based on the public information I and the like. A private key deleting unit 163 performs processing to delete the private key P' from the camera 141.

The description now returns to FIG. 17. The verification data private information generating & the private key deleting unit 146, in step S172, determines whether to start up the verification data private information generating unit 162 using the private information generation start up unit 161. Incidentally, this determination is performed similarly to the configuration according to the first and second embodiments. That is, the determination is performed based on whether a predetermined action has occurred.

If it is not judged in step S172 to start up the verification data private information generating unit 162 (step S172: NO), the processing waits for the predetermined action to occur. If the predetermined action occurs and it is judged to start up the verification data private information generating unit 162 (step S172: YES), the processing proceeds to step S173.

At step S173, the verification data private information generating unit 162 executes processing to generate the private information K.

The verification data private information generating unit 162 firstly acquires I held in the public information management unit 151. Next, the verification data private information generating unit 162 performs K=E(I,P') using the private key P' held in the ROM 145. The private information K is acquired as a result of the above processing. K is stored in a private information management unit 152 as private information for use in creating verification data.

After the processing of step S173 has been executed, the private key deleting unit 163 of the verification data private information generating & the private key deleting unit 146 immediately executes processing to delete the private key P' (step S174). The private key deleting unit 163 deletes the private key P' from the camera 141 by overwriting memory or the like. The private information recovery is then ended.

Note that description of the generation of verification data M for the image D performed in the camera 141, which is shown in FIG. 4 similarly to the first and second embodiments, is omitted.

As described above, the image generating apparatus 141, as an information processing apparatus according to the present embodiment, inputs public information corresponding to the camera 141, encrypts this public information based on prestored key information, and uses the encrypted public information in the generation of information used in detecting falsification of image data. Information used in detecting falsification can thus be set without performing encryption. Also, security with regard to the leaking of key information can be bolstered since the key information is deleted from the camera 141 with the encryption of public information.

Other Embodiments

Other embodiments are shown below based on the configurations according to the first to third embodiments.

The action based on which a judgment is made as to whether to start up the decrypting & private information deleting unit 17 or the verification data private information generating & the private key deleting unit 146 in the camera 11 or the camera 141 (hereinafter, "camera") may be the occurrence of an event related to time. For example, a time or time period for performing the above start up may be preset, and the action for performing the above start up may be recognition that the set time or time period has been reached using an inbuilt timer of the camera or a waveclock from an external source.

Also, an execution frequency confirmation flag or an execution frequency confirmation counter holding the number of start ups of the decrypting & private information deleting unit 17 or the verification data private information generating & the private key deleting unit 146 may be configured in the camera. The above start up determination can be limited to one execution by setting a flag or incrementing the counter if the above start up is performed. Note that erroneous operation can be further controlled by holding the counter or flag in a memory area that cannot be accessed internally or externally other than when referenced for the above start up.

Also, the first embodiment was described in terms of performing verification data generation on the image data of a subject, although the target of verification data generation is not limited to this. For example, verification data can be generated for information that equates to the metadata of image data such as auxiliary parameters (e.g., shooting time, focal length, aperture value, ISO sensitivity, photometry mode, image file size, shooter information, etc.) using similar processing to image data. The verification of verification data related to an auxiliary parameter can also be executed using processing similar to the verification of verification data related to image data.

This is clearly realizable by replacing image data with metadata, that is, by switching the hash function input from image data to metadata, since both image data and metadata are binary data. This data switching can be executed by a control unit, for example. Thus, if the verification is performed by assigning verification data to an auxiliary parameter, similar processing can be executed with the image D as an auxiliary parameter in the processing of FIG. 2.

Also, the object of the present invention is, needless to say, achieved even by the computer (or CPU, MPU) of a system or an apparatus executing the program code of software that realizes the functions of the above embodiments. In this case, the actual program code read from a recording medium realizes the functions of the above embodiments, and the recording medium on which the program code is recorded constitutes the present invention. Note that the above program can, for example, be supplied by supplying a recording medium (or storage medium) on which the program is recorded to the system or apparatus, and the system or apparatus reading the program code stored on the recording medium.

The technical scope of the present invention is not limited to the case where the functions of the above embodiments are realized by executing program code read by a computer. Needless to say, the present invention also includes the case where, for example, an operating system (OS) running on the computer executes part or all of the actual processing based on the instructions of this program code, and the functions of the above embodiments are realized by this processing.

Further, the case where processing is performed based on the instructions of a program written in the memory of a function expansion card or a function expansion unit inserted into or connected to a computer, and the functions of the above embodiments are realized by this processing is also, needless to say, included in the technical scope of the present invention. Specifically, program code read from a recording medium is written to the memory provided in the function expansion card or the function expansion unit inserted into or connected to a computer, for example. A CPU or the like provided in the function expansion card or the function expansion unit then performs part or all of the actual processing based on the instructions of the program code. The case in which the functions of the above embodiments are realized by such processing is also included in the technical scope of the present invention.

In the case where the present invention is applied in the above recording medium, program code corresponding to the flowcharts described above is stored on the recording medium.

As described above, the present invention provides a technique for setting private information in an apparatus while at the same time ensuring a level of security above that of conventional methods.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-004194, filed Jan. 11, 2006 and No. 2006-350498, filed Dec. 26, 2006, hereby incorporated by reference herein in their entirety.

What is claimed is:

1. An information processing apparatus that generates private information used as one of an encryption key for encrypting data or a generation key for generating falsification detection information used in detecting falsification of data, comprising:
 a storage unit adapted to prestore key information;
 an input unit adapted to input calculation target information;
 a calculating unit adapted to perform a calculation on targeted information based on the key information stored in the storage unit;
 a detecting unit adapted to detect a predetermined event;
 a control unit adapted, when triggered by detection of the event by the detecting unit, to perform controls to generate the private information by making the calculating unit perform the calculation with the input calculation target information as the targeted information, and to place the key information stored in the storage unit in an unusable state;
 an image capturing unit; and
 a generating unit adapted to generate, based on image data captured by the image capturing unit and the generated private information, the falsification detection information used in detecting falsification of the image data.

2. A computer-readable storage medium storing a computer program for causing a computer to function as the information processing apparatus of claim 1.

3. A control method for an information processing apparatus that includes a storage unit adapted to prestore key information and generates private information used as one of an encryption key for encrypting data or a generation key for generating falsification detection information used in detecting falsification of data, comprising:
 an input step of inputting calculation target information;
 a detecting step of detecting a predetermined event;
 a control step adapted, when triggered by detection of the event in the detecting step, to perform controls to generate the private information by performing a calculation on the input calculation target information based on the key information stored in the storage unit, and to place the key information stored in the storage unit in an unusable state;
 an image capturing step of capturing an image; and
 a generating step of generating, based on the image data captured in the image capturing step and the generated private information, the falsification detection information used in detecting falsification of the image data.

* * * * *